United States Patent
Mertesdorf

(10) Patent No.: US 10,625,978 B2
(45) Date of Patent: Apr. 21, 2020

(54) CABLE STORAGE SPOOL WITH CENTER FEED

(71) Applicant: CommScope Technologies LLC, Hickory, NC (US)

(72) Inventor: Daniel Ray Mertesdorf, Tehachapi, CA (US)

(73) Assignee: CommScope Technologies LLC, Hickory, NC (US)

(*) Notice: Subject to any disclaimer, the term of this patent is extended or adjusted under 35 U.S.C. 154(b) by 99 days.

(21) Appl. No.: 15/903,895

(22) Filed: Feb. 23, 2018

(65) Prior Publication Data

US 2019/0062100 A1    Feb. 28, 2019

Related U.S. Application Data

(63) Continuation of application No. 13/872,655, filed on Apr. 29, 2013, now Pat. No. 9,908,742.
(Continued)

(51) Int. Cl.
*B65H 75/44*        (2006.01)
*B65H 54/28*        (2006.01)
(Continued)

(52) U.S. Cl.
CPC ..... *B65H 75/4402* (2013.01); *B65H 54/2896* (2013.01); *B65H 57/20* (2013.01);
(Continued)

(58) Field of Classification Search
CPC .... B65H 75/4402; B65H 75/38; B65H 75/40; B65H 75/4471; B65H 54/2896;
(Continued)

(56) References Cited

U.S. PATENT DOCUMENTS

| | | | |
|---|---|---|---|
| 342,354 A | 5/1886 | Harper | |
| 415,423 A | 11/1889 | Smith | |

(Continued)

FOREIGN PATENT DOCUMENTS

| | | |
|---|---|---|
| DE | 1253985 | 11/1967 |
| EP | 0 292 460 A2 | 11/1988 |

(Continued)

OTHER PUBLICATIONS

Catalogue-Fastening Solutions—RICHCO—(Version JPG)—p. 227, 3 pages (Date Unknown).
(Continued)

*Primary Examiner* — Michael E Gallion
(74) *Attorney, Agent, or Firm* — Merchant & Gould P.C.

(57) ABSTRACT

A telecommunications cable spool for storing, paying-out, and reeling-in a telecommunications cable includes a spool, an axis of rotation, and a rotatable cable guide mounted about the axis. The spool defines a wrapping area that receives a plurality of wraps of the cable and defines a circumference. The axis passes through the spool within the circumference. The guide defines a rotating cable guide path with a first end adjacent the wrapping area and a second end positioned near the axis. The first end of the path is oriented at least partially tangential to the circumference, and the second end of the path is oriented at least partially aligned with the axis. The cable is routed along a cable route that extends between first and second ends with a storage portion between the ends of the route. The route includes a transitional portion along the guide path between the storage portion and the second end of the route. A portion of the transitional portion is routed through a center of the storage portion. A deployed portion of the cable is paid-out from the second end of the cable route.

10 Claims, 26 Drawing Sheets

Related U.S. Application Data

(60) Provisional application No. 61/640,449, filed on Apr. 30, 2012.

(51) Int. Cl.

| | | |
|---|---|---|
| *B65H 57/20* | (2006.01) | |
| *B65H 75/38* | (2006.01) | |
| *B65H 75/40* | (2006.01) | |
| *G02B 6/44* | (2006.01) | |
| *H02G 11/02* | (2006.01) | |

(52) U.S. Cl.
CPC ............ *B65H 75/38* (2013.01); *B65H 75/40* (2013.01); *B65H 75/4471* (2013.01); *G02B 6/4458* (2013.01); *H02G 11/02* (2013.01); *B65H 2701/32* (2013.01); *B65H 2701/34* (2013.01)

(58) Field of Classification Search
CPC .......... B65H 2701/32; B65H 2701/34; B65H 57/20; G02B 6/4458; H02G 11/02
See application file for complete search history.

(56) References Cited

U.S. PATENT DOCUMENTS

| | | |
|---|---|---|
| 1,137,133 A | 4/1915 | Hamelback |
| 1,276,825 A | 8/1918 | Swope |
| 1,588,577 A | 6/1926 | Heifler |
| 1,592,030 A | 7/1926 | Langsner |
| 1,858,371 A | 5/1932 | Lutz |
| 1,914,654 A * | 6/1933 | Tornblom ............... B65H 75/44 137/355.17 |
| 2,206,352 A | 7/1940 | Hellmann |
| 2,227,442 A | 1/1941 | De Millar |
| 2,260,109 A | 10/1941 | Amdal |
| 2,440,974 A | 5/1948 | Resch |
| 2,605,060 A | 7/1952 | Bell |
| 2,752,106 A | 6/1956 | Thompson |
| 2,776,093 A | 1/1957 | Cox et al. |
| 2,874,918 A | 2/1959 | Steiber |
| 2,905,409 A | 9/1959 | Sheldon |
| 2,941,746 A | 6/1960 | Hunt |
| 3,015,384 A | 1/1962 | Kellogg |
| 3,120,355 A | 2/1964 | Bowman |
| 3,160,360 A | 12/1964 | Spieldiener et al. |
| 3,186,659 A * | 6/1965 | Arnold ................. B65H 75/364 242/129 |
| 3,208,121 A | 9/1965 | Price |
| 3,312,381 A * | 4/1967 | Güttler ................... B65H 51/20 242/364 |
| 3,322,372 A * | 5/1967 | Hellstrom .............. H02G 11/02 242/386 |
| 3,632,061 A | 1/1972 | Roseboom |
| 3,640,440 A | 2/1972 | Sedlarik et al. |
| 3,703,261 A | 11/1972 | Cofer et al. |
| 3,737,112 A | 6/1973 | Tellerman et al. |
| 3,759,455 A | 9/1973 | Clemens |
| 3,822,834 A | 7/1974 | Fjarlie |
| 3,831,879 A | 8/1974 | Miller et al. |
| 3,843,071 A | 10/1974 | Graham |
| 3,844,504 A | 10/1974 | Lawson |
| 4,008,791 A | 2/1977 | Shafii-Kahany et al. |
| 4,055,314 A | 10/1977 | Kovaleski |
| 4,108,390 A | 8/1978 | Hayes |
| 4,111,380 A | 9/1978 | Heuckroth |
| 4,174,816 A | 11/1979 | Olson |
| 4,186,897 A | 2/1980 | Brown |
| 4,222,535 A | 9/1980 | Hosbein |
| 4,273,392 A | 6/1981 | Stinson |
| 4,282,954 A | 8/1981 | Hill |
| 4,301,611 A | 11/1981 | Lapinski |
| 4,383,655 A | 5/1983 | Ahrendt et al. |
| 4,436,224 A | 3/1984 | McInerny |
| 4,441,531 A | 4/1984 | Umezawa et al. |
| 4,535,946 A | 8/1985 | Thevenon |
| 4,565,333 A | 1/1986 | Meneian |
| 4,664,260 A | 5/1987 | Stokes |
| 4,773,607 A | 9/1988 | Missout et al. |
| 4,880,182 A | 11/1989 | Gelfman |
| 4,936,452 A | 6/1990 | Pauley |
| 4,978,191 A | 12/1990 | Hasegawa et al. |
| 5,018,678 A | 5/1991 | Peterson |
| 5,022,600 A | 6/1991 | Blanc et al. |
| 5,058,259 A | 10/1991 | Araki et al. |
| 5,069,523 A | 12/1991 | Finzel et al. |
| 5,078,466 A | 1/1992 | MacCulloch |
| 5,098,028 A | 3/1992 | Ida et al. |
| 5,117,859 A | 6/1992 | Carlson |
| 5,165,543 A | 11/1992 | Heyda et al. |
| 5,230,480 A * | 7/1993 | Perry ................ B65H 54/2896 242/128 |
| 5,265,822 A | 11/1993 | Shober, Jr. et al. |
| 5,268,986 A | 12/1993 | Kakii et al. |
| 5,277,314 A | 1/1994 | Cooper et al. |
| 5,294,068 A | 3/1994 | Baro et al. |
| 5,305,937 A | 4/1994 | Barnett |
| 5,332,171 A | 7/1994 | Steff |
| 5,335,874 A | 8/1994 | Shrum et al. |
| 5,367,827 A | 11/1994 | Tajima et al. |
| 5,374,005 A | 12/1994 | Jenkins et al. |
| 5,388,781 A | 2/1995 | Sauber |
| 5,421,530 A | 6/1995 | Bertagna et al. |
| 5,450,509 A | 9/1995 | Davis |
| 5,465,917 A * | 11/1995 | Kosch .................... B65H 57/20 242/128 |
| 5,481,607 A | 1/1996 | Hsiao |
| 5,494,446 A | 2/1996 | DeLucia et al. |
| 5,544,836 A | 8/1996 | Pera |
| 5,598,987 A | 2/1997 | Wachowicz |
| 5,607,316 A | 3/1997 | Ishikawa |
| 5,630,456 A | 5/1997 | Hugo et al. |
| 5,641,067 A | 6/1997 | Ellis |
| 5,669,571 A | 9/1997 | Gray bill |
| 5,679,015 A | 10/1997 | Schauer |
| 5,689,605 A | 11/1997 | Cobb |
| 5,758,834 A | 6/1998 | Dragoo et al. |
| 5,772,146 A | 6/1998 | Kawamoto et al. |
| 5,797,558 A | 8/1998 | Peterson et al. |
| 5,802,237 A | 9/1998 | Pulido |
| 5,857,285 A | 1/1999 | Little |
| 5,887,815 A * | 3/1999 | Pierce ................ B65H 54/2896 191/12.2 A |
| 5,913,487 A | 6/1999 | Leatherman |
| 5,915,062 A | 6/1999 | Jackson et al. |
| 5,915,641 A | 6/1999 | Barberg |
| 5,921,497 A | 7/1999 | Utley, Jr. |
| D412,439 S | 8/1999 | Cormack |
| 5,993,229 A | 11/1999 | Tanaka et al. |
| 5,996,930 A * | 12/1999 | Katayama ............... B65H 49/08 242/128 |
| 6,015,110 A | 1/2000 | Lai |
| 6,019,308 A | 2/2000 | Huang |
| D422,170 S | 4/2000 | Harris, Jr. |
| 6,077,108 A | 6/2000 | Lorscheider et al. |
| 6,141,948 A | 11/2000 | Brazeau |
| 6,215,938 B1 | 4/2001 | Reitmeier et al. |
| 6,220,413 B1 | 4/2001 | Walters et al. |
| 6,250,578 B1 | 6/2001 | Manda |
| 6,260,781 B1 | 7/2001 | Cooper |
| 6,276,625 B1 | 8/2001 | Chee et al. |
| 6,305,958 B1 | 10/2001 | Maegawa et al. |
| 6,311,007 B1 | 10/2001 | Daoud |
| 6,325,665 B1 | 12/2001 | Chung |
| 6,328,243 B1 | 12/2001 | Yamamoto |
| 6,349,893 B1 | 2/2002 | Daoud |
| 6,361,237 B1 | 3/2002 | Salmela |
| 6,375,109 B1 | 4/2002 | Liao |
| 6,405,961 B1 | 6/2002 | Mastrangelo |
| 6,422,503 B1 | 7/2002 | Hoo Kong |
| 6,433,274 B1 | 8/2002 | Doss et al. |
| 6,434,313 B1 | 8/2002 | Clapp, Jr. et al. |
| 6,484,958 B1 | 11/2002 | Xue et al. |

(56) References Cited

U.S. PATENT DOCUMENTS

| | | |
|---|---|---|
| 6,501,898 B1 | 12/2002 | Engberg et al. |
| 6,522,826 B2* | 2/2003 | Gregory .............. G01C 19/722 356/450 |
| 6,572,393 B2 | 6/2003 | Kawamura |
| 6,574,922 B2 | 6/2003 | Velthaus et al. |
| RE38,211 E | 8/2003 | Peterson et al. |
| 6,612,515 B1 | 9/2003 | Tinucci et al. |
| 6,616,080 B1 | 9/2003 | Edwards et al. |
| 6,643,443 B2 | 11/2003 | Holman et al. |
| 6,643,444 B1 | 11/2003 | Putnam |
| 6,643,445 B2 | 11/2003 | Bumgarner et al. |
| 6,726,139 B2 | 4/2004 | Persson |
| 6,733,328 B2 | 5/2004 | Lin et al. |
| 6,744,954 B1 | 6/2004 | Tanaka et al. |
| 6,795,633 B2 | 9/2004 | Joseph, II |
| 6,819,848 B2 | 11/2004 | Takahashi |
| D501,722 S | 2/2005 | Zimmerman |
| 6,856,748 B1 | 2/2005 | Elkins, II et al. |
| 6,871,812 B1 | 3/2005 | Chang |
| 6,915,058 B2 | 7/2005 | Pons |
| 6,997,410 B1 | 2/2006 | Huang |
| 7,017,846 B2 | 3/2006 | Tsoi et al. |
| 7,032,854 B2* | 4/2006 | Marsden .............. H02G 11/02 242/388.1 |
| 7,036,761 B2 | 5/2006 | Washington et al. |
| 7,086,512 B2 | 8/2006 | Shack et al. |
| 7,104,491 B2 | 9/2006 | Vinding |
| 7,111,803 B2 | 9/2006 | Mott et al. |
| 7,116,883 B2 | 10/2006 | Kline et al. |
| 7,120,349 B2 | 10/2006 | Elliott |
| 7,182,286 B2 | 2/2007 | Huang |
| 7,229,042 B2 | 6/2007 | Thebault et al. |
| D551,477 S | 9/2007 | Kikuchi |
| 7,266,283 B2 | 9/2007 | Kline et al. |
| 7,315,681 B2 | 1/2008 | Kewitsch |
| 7,357,666 B2 | 4/2008 | Wu |
| 7,369,739 B2* | 5/2008 | Kline .............. B65H 75/44 385/135 |
| 7,460,753 B2 | 12/2008 | Kewitsch |
| 7,487,932 B2 | 2/2009 | Ellis |
| 7,497,351 B2 | 3/2009 | Amundson et al. |
| 7,510,349 B2 | 3/2009 | Berg |
| 7,548,679 B2 | 6/2009 | Hirano et al. |
| 7,599,598 B2 | 10/2009 | Gniadek et al. |
| 7,627,218 B2 | 12/2009 | Hurley |
| 7,665,901 B2 | 2/2010 | Kewitsch |
| 7,680,386 B2 | 3/2010 | Hurley |
| 7,715,679 B2 | 5/2010 | Kowalczyk et al. |
| 7,756,379 B2 | 7/2010 | Kowalczyk et al. |
| 7,869,682 B2 | 1/2011 | Kowalczyk et al. |
| 8,238,707 B2 | 8/2012 | Smrha et al. |
| 8,474,742 B2 | 7/2013 | Smrha |
| 8,689,975 B2 | 4/2014 | Burke |
| 8,720,810 B2 | 5/2014 | Whitaker |
| 8,800,910 B2 | 8/2014 | Shepherd |
| 9,099,851 B2* | 8/2015 | Berg .............. H02G 1/10 |
| 9,126,802 B2 | 9/2015 | Holmberg et al. |
| 9,908,742 B2* | 3/2018 | Mertesdorf ........ B65H 75/4402 |
| 2002/0122643 A1 | 9/2002 | Bueschelberger et al. |
| 2003/0059192 A1 | 3/2003 | Johnson |
| 2003/0089818 A1 | 5/2003 | Reau et al. |
| 2003/0095773 A1 | 5/2003 | Ichinari et al. |
| 2004/0211851 A1 | 10/2004 | Barton et al. |
| 2005/0167544 A1 | 8/2005 | Elliott et al. |
| 2005/0247813 A1 | 11/2005 | Kovacevich et al. |
| 2005/0263640 A1 | 12/2005 | Vanderslice |
| 2006/0045458 A1 | 3/2006 | Sasaki et al. |
| 2006/0151654 A1 | 7/2006 | Pitcher |
| 2006/0196989 A1* | 9/2006 | Bartley .............. B65H 49/08 242/601 |
| 2006/0264921 A1 | 11/2006 | Deutsch et al. |
| 2007/0031101 A1* | 2/2007 | Kline .............. B65H 75/44 385/135 |
| 2007/0189829 A1 | 8/2007 | Matsushita et al. |
| 2007/0196053 A1 | 8/2007 | Kewitsch |
| 2007/0278227 A1 | 12/2007 | Damaghi et al. |
| 2008/0019642 A1 | 1/2008 | Kewitsch |
| 2008/0156922 A1 | 7/2008 | Rabinowitz et al. |
| 2008/0273844 A1 | 11/2008 | Kewitsch |
| 2008/0292261 A1 | 11/2008 | Kowalczyk et al. |
| 2009/0060441 A1 | 3/2009 | Kowalczyk et al. |
| 2009/0065629 A1 | 3/2009 | Veit |
| 2009/0074370 A1 | 3/2009 | Kowalczyk et al. |
| 2009/0097797 A1 | 4/2009 | Kewitsch |
| 2009/0140093 A1 | 6/2009 | Wu |
| 2009/0324189 A1 | 12/2009 | Hill et al. |
| 2010/0054680 A1 | 3/2010 | Lochkovic et al. |
| 2010/0329621 A1 | 12/2010 | Makrides-Saravanos et al. |
| 2011/0006146 A1 | 1/2011 | Soper et al. |
| 2011/0024543 A1 | 2/2011 | Smrha |
| 2011/0024544 A1 | 2/2011 | Smrha et al. |
| 2011/0073700 A1 | 3/2011 | Godett et al. |
| 2011/0085775 A1 | 4/2011 | Van Zuylen et al. |
| 2011/0154867 A1 | 6/2011 | Fawcett et al. |
| 2011/0297781 A1 | 12/2011 | Peters |
| 2012/0168554 A1 | 7/2012 | Blunt et al. |
| 2012/0205477 A1 | 8/2012 | Whitaker |
| 2013/0161430 A1 | 6/2013 | Weissbrod |
| 2013/0233962 A1* | 9/2013 | Wells .............. B65H 16/005 242/588.3 |
| 2013/0284844 A1 | 10/2013 | Holmberg et al. |
| 2013/0287359 A1 | 10/2013 | Haataja |
| 2013/0306780 A1 | 11/2013 | Marcouiller et al. |
| 2014/0027560 A1 | 1/2014 | Flood |
| 2014/0131505 A1* | 5/2014 | Gonzalez .............. B65H 49/08 242/588.2 |
| 2014/0161411 A1 | 6/2014 | Slater et al. |

FOREIGN PATENT DOCUMENTS

| | | |
|---|---|---|
| EP | 0 531 628 A1 | 3/1993 |
| FR | 2 645 360 A1 | 10/1990 |
| FR | 2 743 359 A1 | 7/1997 |
| GB | 2 275 041 A | 8/1994 |
| JP | 2-296201 | 12/1990 |
| JP | 5-303018 | 11/1993 |
| JP | 2000-284129 | 10/2000 |
| JP | 2001-91753 | 4/2001 |
| JP | 2001-169452 | 6/2001 |
| JP | 2001-339837 | 12/2001 |
| JP | 2003-29059 | 1/2003 |
| JP | 2003-329850 | 11/2003 |
| JP | 2003-329851 | 11/2003 |
| JP | 2008-197530 | 8/2008 |
| WO | WO 99/41183 | 8/1999 |
| WO | WO 2006/015343 A2 | 2/2006 |
| WO | WO 2006/078007 A1 | 7/2006 |

OTHER PUBLICATIONS

Decoiler Devices/Traverse Arms/Accessories, http://replay.web.archive.org/20060518044402/https://weldingsupply.securesites.com/, 4 pages (May 18, 2006).

Decoiler Devices/Traverse Arms/Accessories, https://weldingsupply.securesites.com/yeoweld-fax.html, 5 pages (Date Printed May 2, 2011).

European Search Report for Application No. 13784515.2 dated Nov. 20, 2015.

Fiber Management, Richco, p. 211 (Date Unknown).

Fiberlaunch, 4 pages (Copyright 2010).

Fibre Fastening and Routing Components, Richco, pp. 54-72 (Date Unknown).

Fibre Winding Reel, Europlus Technologies plc, 2 pages (Date Unknown).

International Search Report and Witten Opinion for PCT/US2013/038657 dated Aug. 28, 2013.

Still images from video located at http://www.igus.com Dec. 8, 2009—igus_12HMInews, 3 pages (Downloaded Dec. 2009).

Still images from video located at http://www.igus.com/ApplicationCorner/igus%20Videos/E-Chain/Excellent%20quality/

(56) References Cited

OTHER PUBLICATIONS

EChainSystems_for_machinetools.wmv, 6 pages (Downloaded Dec. 2009).
Telescent Catalog Fiber Optic Connectivity, pp. 1-39 (Copyright 2007).

* cited by examiner

FIG. 11
FIG. 12
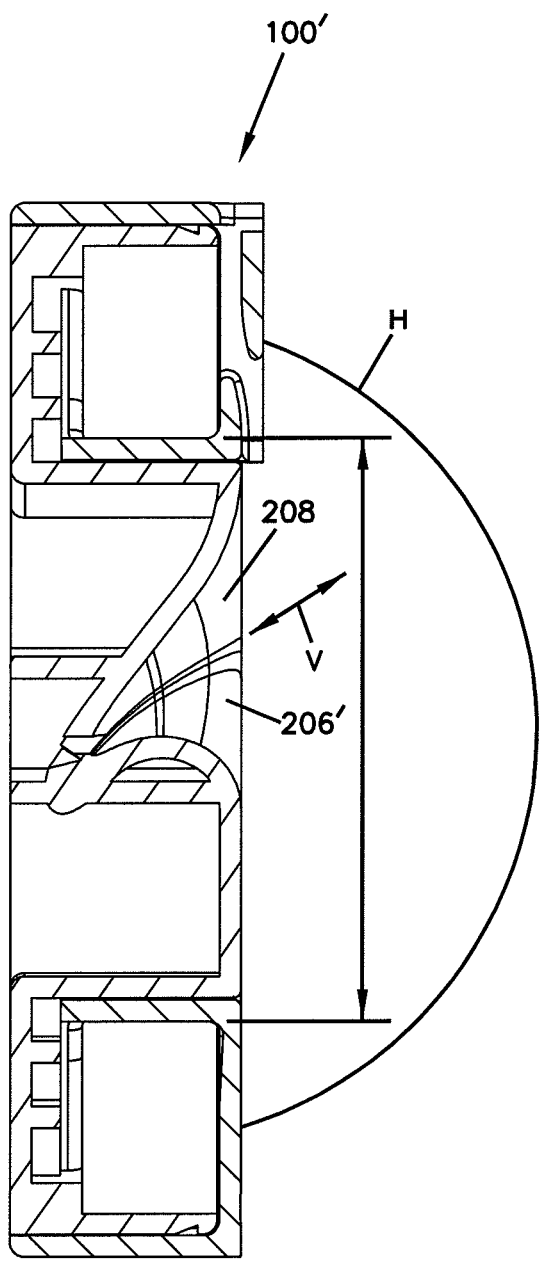
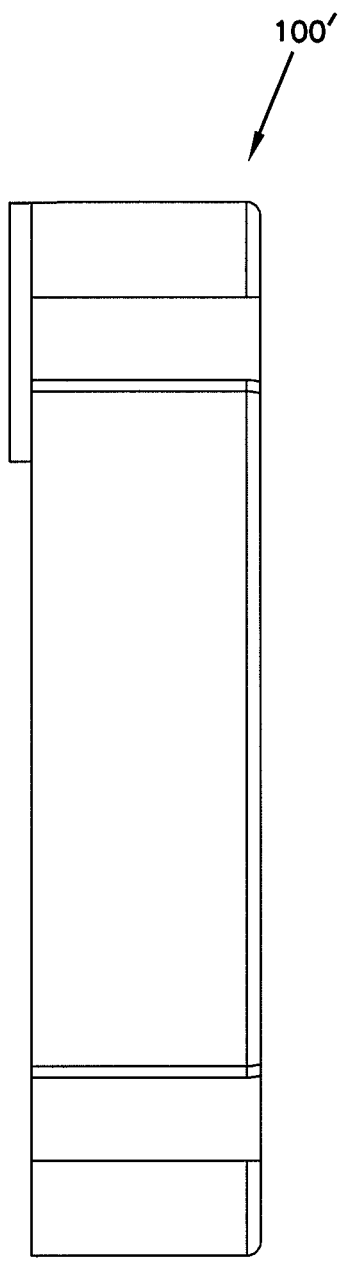

100''''

100''''

CABLE STORAGE SPOOL WITH CENTER FEED

CROSS REFERENCE TO RELATED APPLICATIONS

This application is a continuation of application Ser. No. 13/872,655, filed Apr. 29, 2013, now U.S. Pat. No. 9,908,742, which application claims the benefit of provisional application Ser. No. 61/640,449, filed Apr. 30, 2012, and titled "CABLE STORAGE SPOOL WITH CENTER FEED," which applications are incorporated herein by reference in their entirety.

BACKGROUND

Spools, reels, cassettes, and cartridges can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

An aspect of the present disclosure relates to a telecommunications cable spool for storing, paying-out, and reeling-in a telecommunications cable. The telecommunications cable spool includes a spool, an axis of rotation, and a rotatable cable guide. The spool defines a wrapping area that is adapted to receive a plurality of wraps of the telecommunications cable. The wrapping area defines a circumference. The axis of rotation passes through the spool within the circumference of the wrapping area. The rotatable cable guide is rotatably mounted about the axis of rotation. The rotatable cable guide defines a rotating cable guide path that extends between a first end that is adjacent the wrapping area of the spool and a second end that is positioned nearer to the axis of rotation than the circumference of the wrapping area. The first end of the rotating cable guide path is oriented at least partially tangential to the circumference of the wrapping area, and the second end of the rotating cable guide path is oriented at least partially aligned with the axis of rotation.

Other aspects of the present disclosure may include a telecommunications cable spool for storing and paying-out a telecommunications cable. The telecommunications cable spool includes a cable route of a variable length, a spool that defines a wrapping area, and a guide member. The telecommunications cable is routed along the variable length of the cable route. The cable route extends between a first end and a second end. The cable route includes a storage portion that is positioned between the first and the second ends of the cable route. The storage portion includes a coil-like configuration. The cable route includes a transitional portion that is positioned between the storage portion and the second end of the cable route. The transitional portion includes a first end that smoothly transitions from the coil-like configuration of the storage portion and a second end. A portion of the transitional portion is routed through the coil-like configuration of the storage portion. The spool defines a wrapping area that is adapted to receive a plurality of wraps of the coil-like configuration of the storage portion of the cable route. The guide member is adapted to guide the telecommunications cable along the transitional portion of the cable route. The guide member is adapted to receive a stored portion of the telecommunications cable from the storage portion of the cable route and is adapted to pay-out a deployed portion of the telecommunications cable from the second end of the transitional portion of the cable route.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 11 is a cross-sectional end elevation view of the cable winding and unwinding device of FIG. 7;

FIG. 12 is an opposite end elevation view of the cable winding and unwinding device of FIG. 7;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure. When like structure is included on different embodiments, a prime ('), double prime ("), etc. may be appended to the same reference number to indicate the like structure on a different embodiment.

Figure 37:
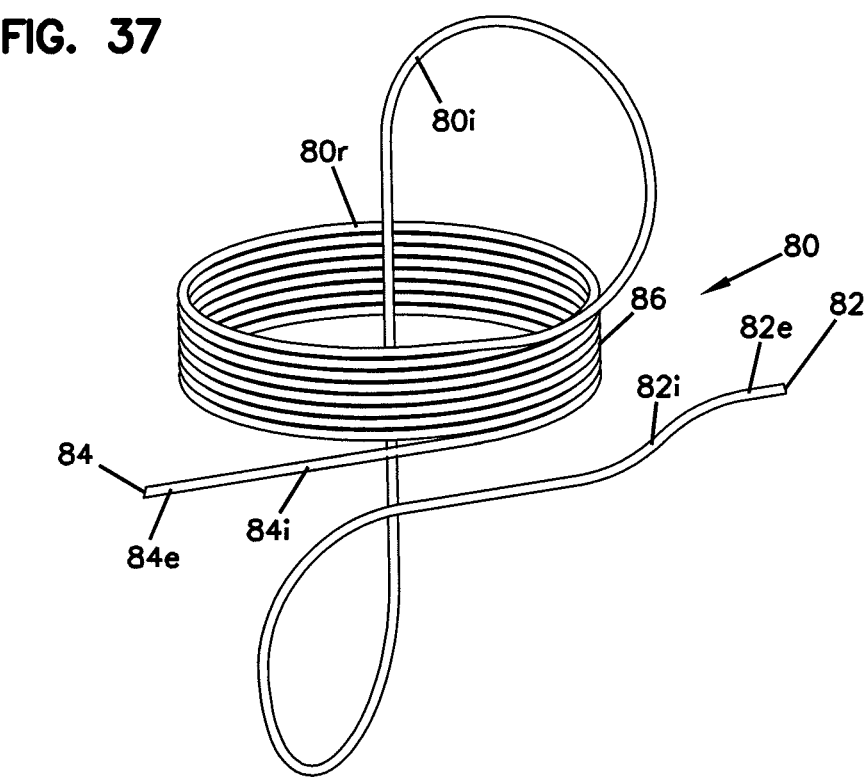
FIG. 37 is the perspective view of FIGS. 29, 31, and 36, but showing only the telecommunications cable of FIG. 29.

According to the principals of the present disclosure, a cable spool assembly 100 is disclosed that may store, pay-out, and reel-in a telecommunications cable 80 (see FIG. 37). The telecommunications cable 80 extends between a first end 82 and a second end 84. The first end 82 of the telecommunications cable 80 may remain attached to a first device, and the second end 84 of the telecommunications cable 80 may remain attached to a second device while the cable spool assembly 100 stores, pays-out, and reels-in the telecommunications cable 80.

The cable spool assembly 100 does not require a rotary union, but rather wraps 86 around the cable spool assembly 100 may be transformed into axial twist along a length of the telecommunications cable 80. In certain embodiments, one rotation of the axial twist may be imparted to the telecommunications cable 80 as each of the wraps 86 are wound around the cable spool assembly 100. In other embodiments, the axial twist may be pre-applied to the telecommunications cable 80 and one rotation of the axial twist may be untwisted from the telecommunications cable 80 for each of the wraps 86 that are wrapped on the cable spool assembly 100. In certain embodiments, an act of wrapping the telecommunications cable 80 about the cable spool assembly 100, imparts one rotation of the axial twist about the telecommunications cable 80 for each of the wraps 86 that are wrapped upon the cable spool assembly 100. By winding and unwinding the telecommunications cable 80 about the cable spool assembly 100, the wraps 86 may be transformed to the axial twist, and the axial twist may be transformed to the wraps 86.

Turning now to the figures and in particular FIGS. 1-6, a first embodiment of a cable spool assembly 100 is illustrated. The cable spool assembly 100 includes a spool portion 140 that is integrated with a base 120 of the cable spool assembly 100 and a winding/unwinding member 170 that defines a cable path 200. The spool portion 140 includes a cable wrapping area 146, a first flange 152, a second flange 154, and a circumferential outer wall 156. The first flange 146 extends between the wrapping area 146 and the circumferential outer wall 156. The second flange 154 extends radially outwardly from the cable wrapping area 146, but is spaced an annular distance from the circumferential wall 156 and thereby forms an annular space 158.

In the depicted embodiment, the first flange 152 and the second flange 154 are each made of complimentary segments 162 and 164, respectively, that do not overlap each other along a circumferential direction. By having the first flange 152 and the second flange 154 not overlap each other in the circumferential direction, an injection molding tool can be made to injection mold the spool portion 140 in one piece. Spaces 166 (i.e., gaps) on the first flange 152 may provide an entrance/exit for the telecommunications cable 80.

The cable winding/unwinding member 170 includes a hub 172 that is positioned within the cable wrapping area 146 of the spool portion 140. The winding/unwinding member 170 includes a flange 174 that extends radially outwardly from the hub 172 to a circumferential flange 176 that is positioned through the annular space 158 of the spool portion 140. The winding/unwinding member 170 defines the cable path 200 that extends from a first end 202 to a second end 204. The second end 204 is oriented at least partially tangential to the cable wrapping area 146 of the spool portion 140. The first end 202 is positioned in the annular space 158 defined between the flange 154 and the circumferential outer wall 156 of the spool portion 140.

The cable path 200 extends from the second end 204 along an externally facing channel 178 that extends along the circumferential flange 176 of the winding/unwinding member 170 and then onto the flange 174 of the cable winding/unwinding member 170 where it spirals toward the hub 172 of the cable winding/unwinding member 170. At the hub 172, the cable path 200 is positioned generally tangentially as it approaches an axis A1 of the cable winding/unwinding member 170 and is positioned within the cable wrapping area 146 of the spool portion 140. The spool portion 140 defines an axis A2 that is concentric with the cable wrapping area 146. The cable wrapping/unwrapping member 170 defines an axis A3 that is concentric with the outer flange 176 of the wrapping/unwrapping member 170.

Figure 2:
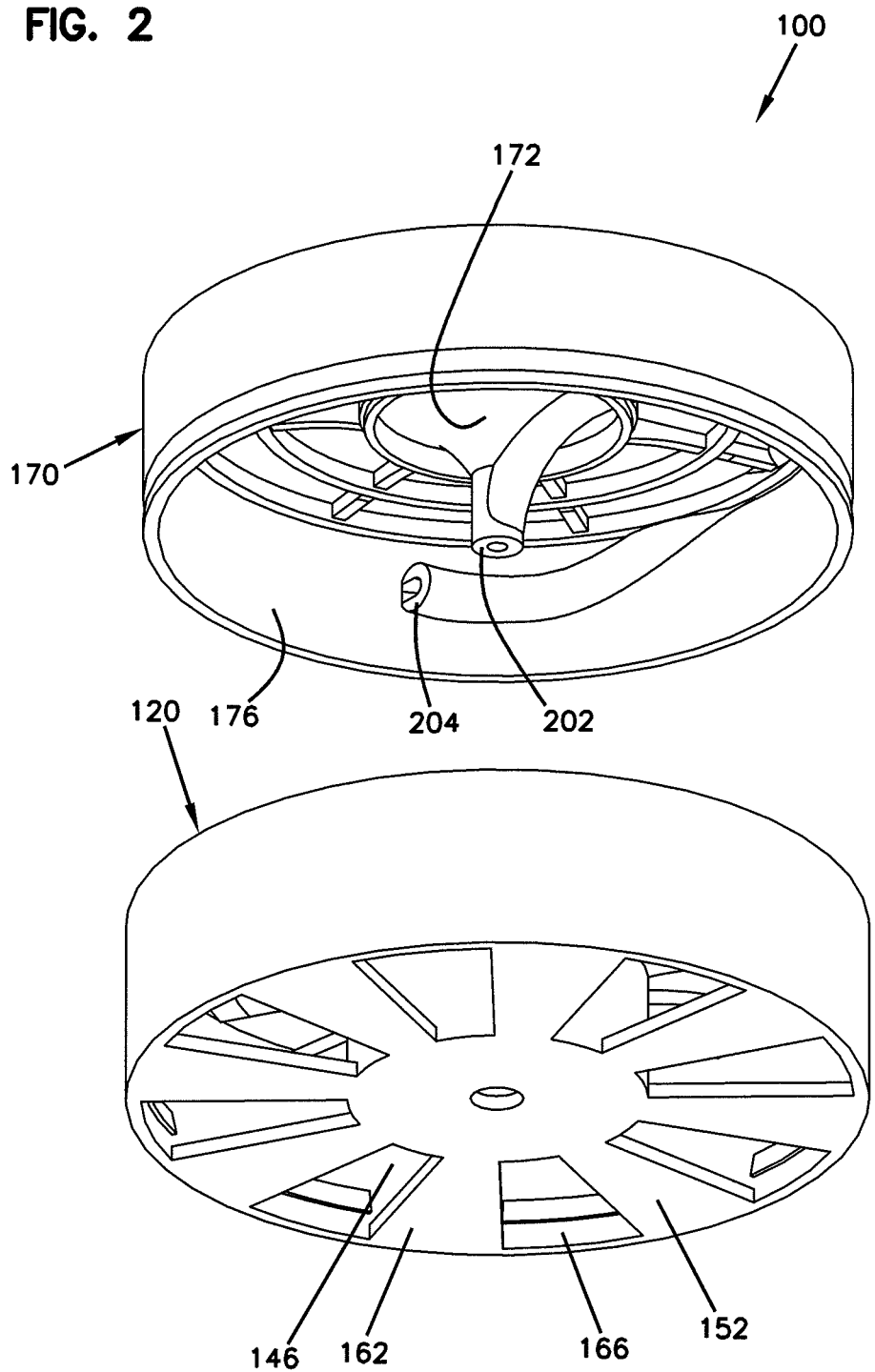
FIG. 2 is another exploded perspective view of the cable winding and unwinding device of FIG. 1.
Figure 3:
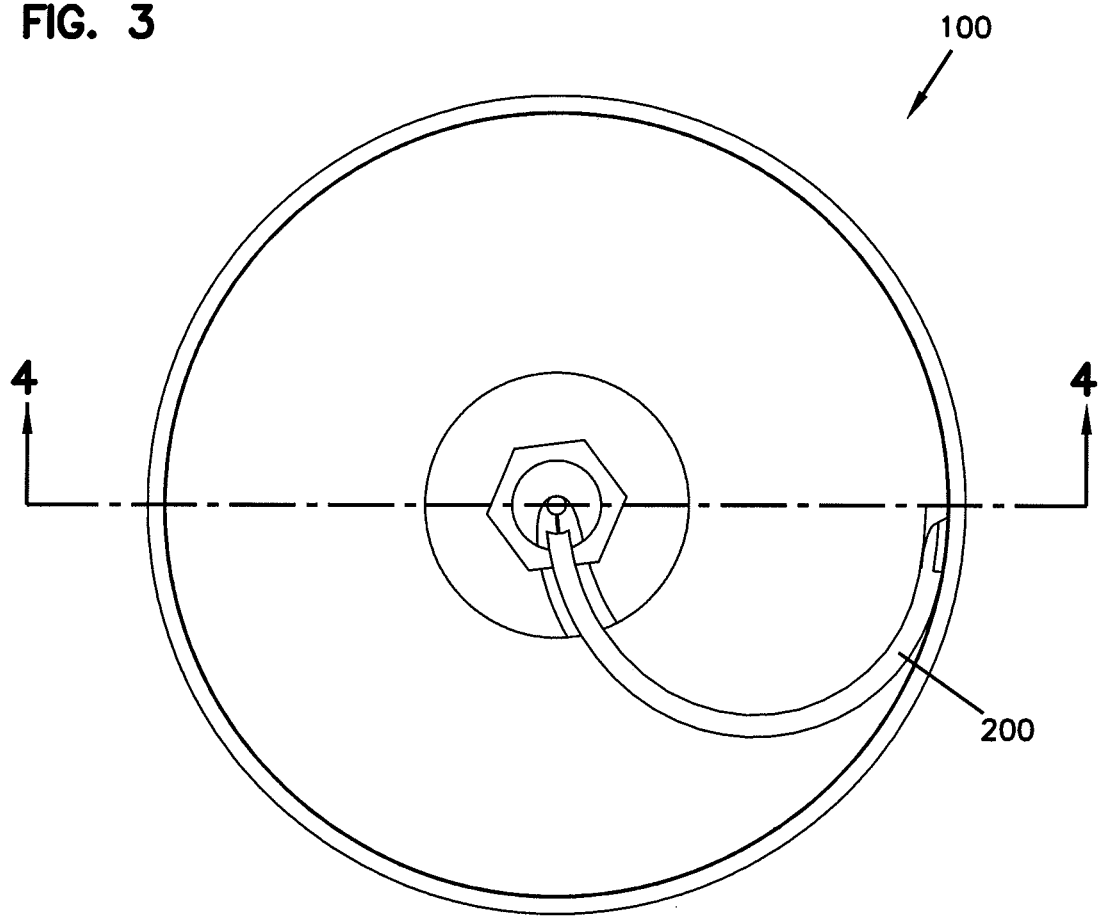
FIG. 3 is a top plan view of the cable winding and unwinding device of FIG. 1.
Figure 4:
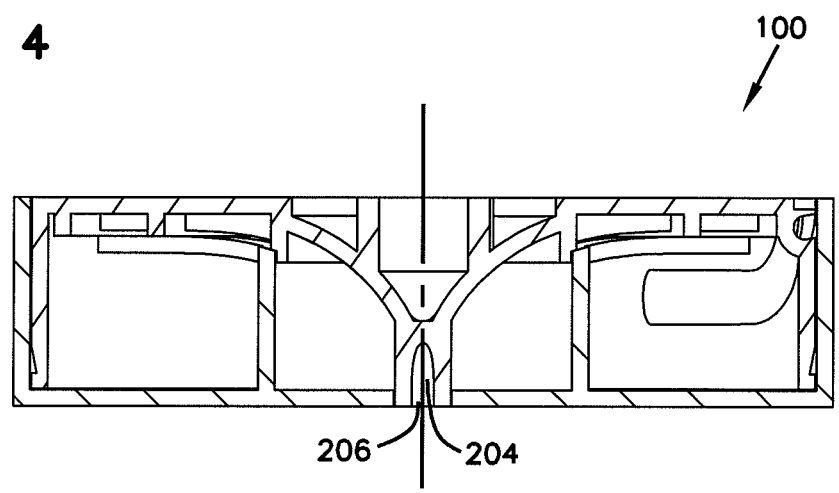
FIG. 4 is a cross-sectional side elevation view of the cable winding and unwinding device of FIG. 1.
Figure 5:
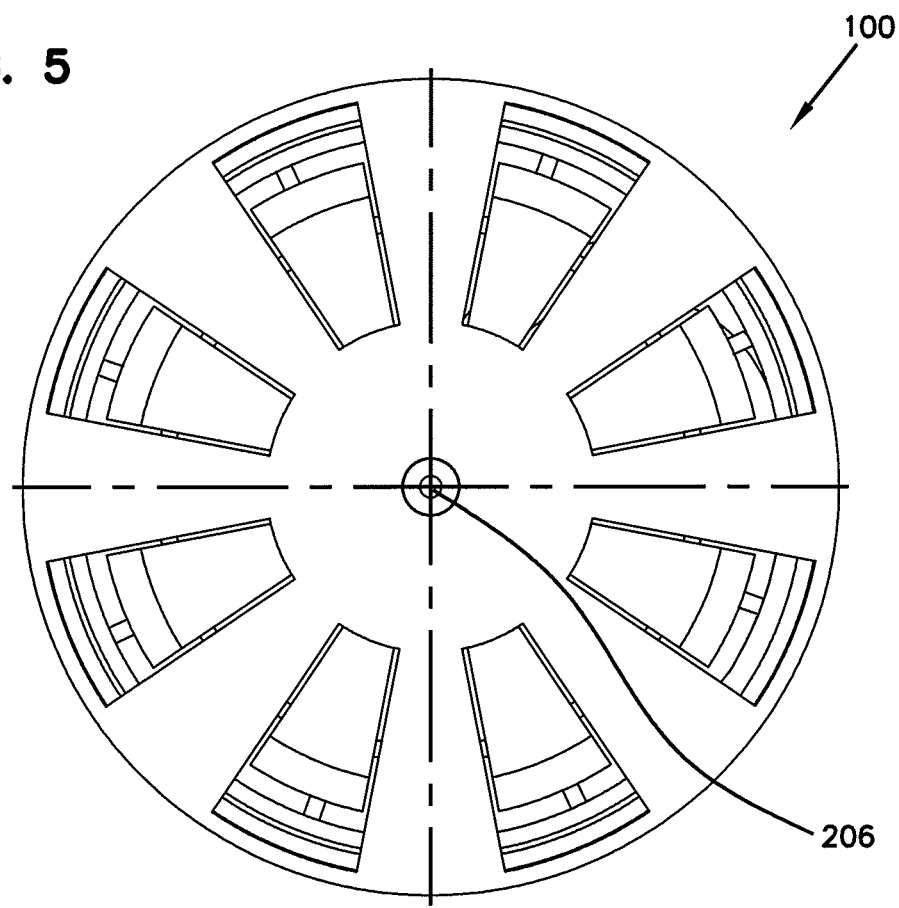
FIG. 5 is a bottom plan view of the cable winding and unwinding device of FIG. 1.
Figure 6:
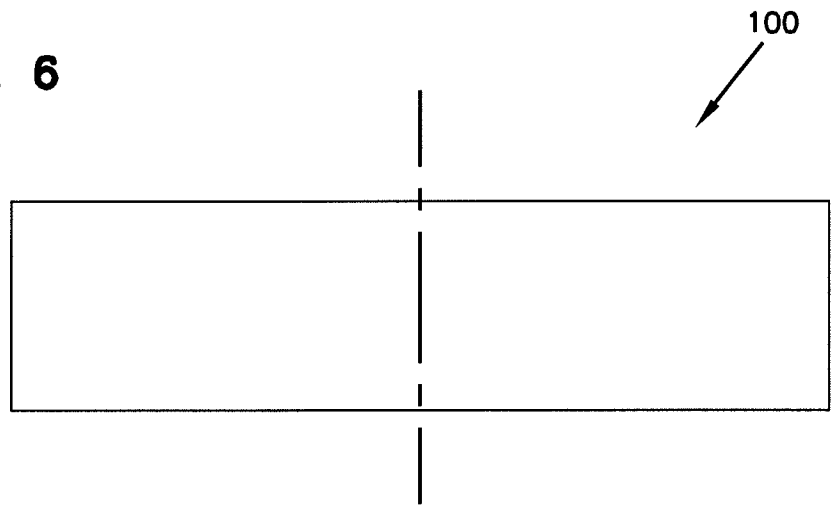
FIG. 6 is a side elevation view of the cable winding and unwinding device of FIG. 1.

As illustrated at FIG. 2, the first end 202 of the cable path 200 exits the cable spool assembly 100 along a direction substantially parallel to the axes A1, A3. The telecommunications cable 80 can be deployed from and retracted into an opening 206 (see FIGS. 4 and 5) that is positioned at the first end 202 of the cable path 200. The opening 206 is defined on the winding/unwinding member 170.

Figure 1:
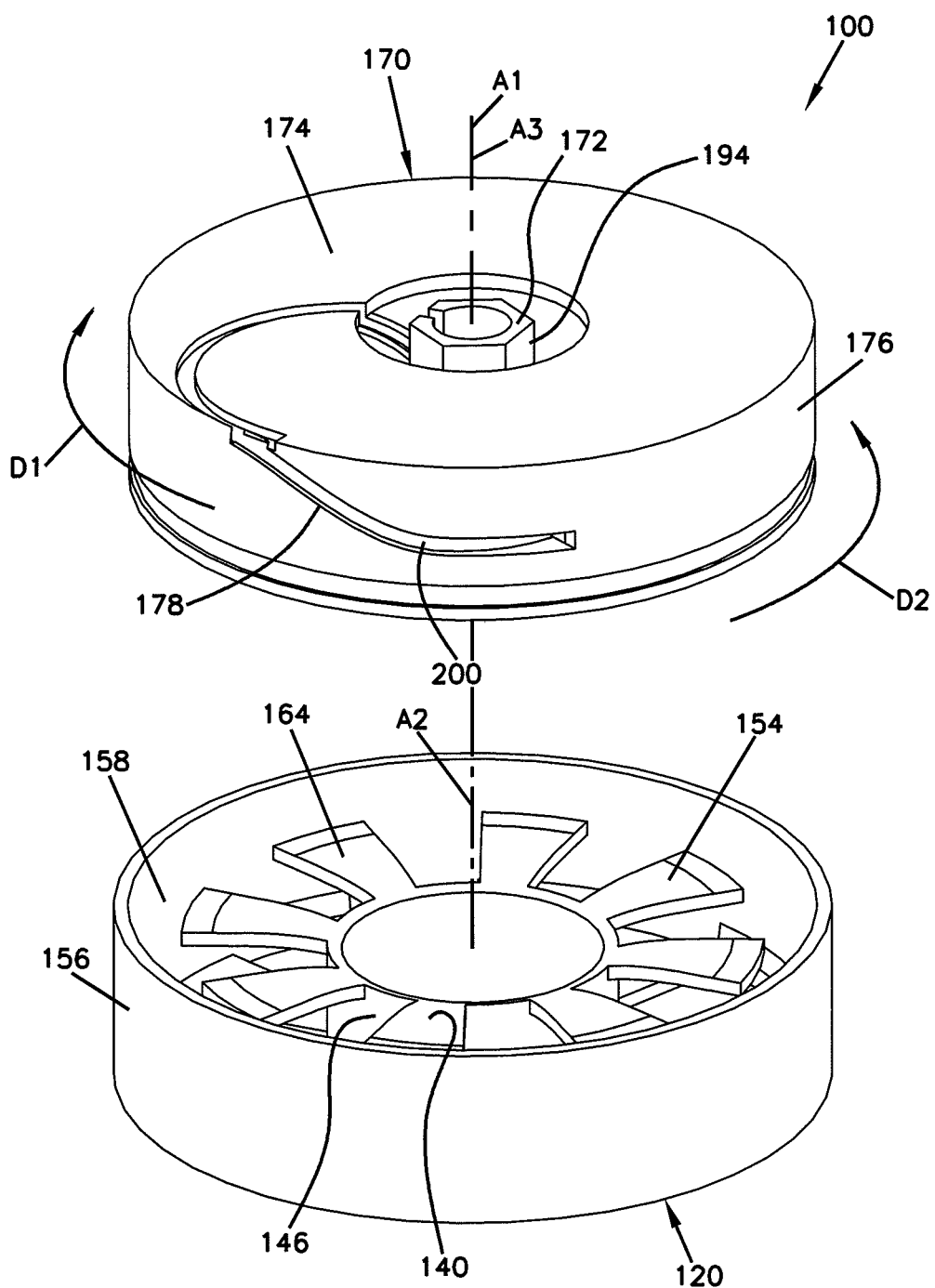
FIG. 1 is an exploded perspective view of a cable winding and unwinding device according to the principles of the present disclosure.

The winding/unwinding member 170 may be rotated relative to the base 120 by engaging a drive attachment 194 (e.g., a hex head) of the hub 172. By rotating the winding/unwinding member 170 in a first rotational direction D1, as illustrated at FIG. 1, a portion of the telecommunications cable 80 that is external to the cable spool assembly 100 is drawn into the opening 206 and begins following the cable path 200 starting at the first end 202 and leaving at the second end 204. Upon leaving the cable path 200, the telecommunications cable 80 is wrapped tangentially around the cable wrapping area 146 between the first flange 152 and the second flange 154. The wrapping may continue to multiple layers deep.

Upon rotating the winding/unwinding member 170 in a second rotational direction D2 as illustrated at FIG. 1, a portion of the telecommunications cable 80 that is wrapped about the cable wrapping area 146 may be drawn into the cable path 200 starting at the second end 204 and ending at the first end 202. The deployment of the telecommunications cable 80 may rotate the winding/unwinding member 170 relative to the base 120 as tension in the telecommunications cable 80 may urge the rotation of the winding/unwinding member 170.

As illustrated at FIGS. 1-6 and 37, the first end 82 of the telecommunications cable 80 may be deployed through the opening 206. A length of the telecommunications cable 80 may extend between the cable spool assembly 100 and the second end 84 and may exit the cable spool assembly 100 through the spaces 166 of the base 120. In the depicted embodiment, the second end 84 is substantially positioned at a fixed distance relative to the cable spool assembly 100 and is therefore non-deployable.

Turning now to FIGS. 7-14, another embodiment of a cable spool assembly 100' is illustrated. The cable spool assembly 100' is similar to the cable spool assembly 100 and, in general, the description of the cable spool assembly 100' will focus on certain additional features provided on the cable spool assembly 100'. As with the cable spool assembly 100, the cable spool assembly 100' includes a base 120' and a winding/unwinding member 170'. The winding/unwinding member 170' defines a cable path 200' similar to the cable path 200. However, the cable path 200' includes an opening 206' with a smooth transitional area 208 that allows the telecommunications cable 80 to enter and exit the cable path 200' in a range of directions. The transitional area 208 includes curved surfaces that prevent the telecommunications cable 80 from bending in excess of any bend radius limitations. Such bend radius limitations are typically found on optical fiber cables. The transitional area 208 may further benefit the cable spool assembly 100' by reducing friction as the telecommunications cable 80 enters and exits the cable spool assembly 100'.

Figure 7:
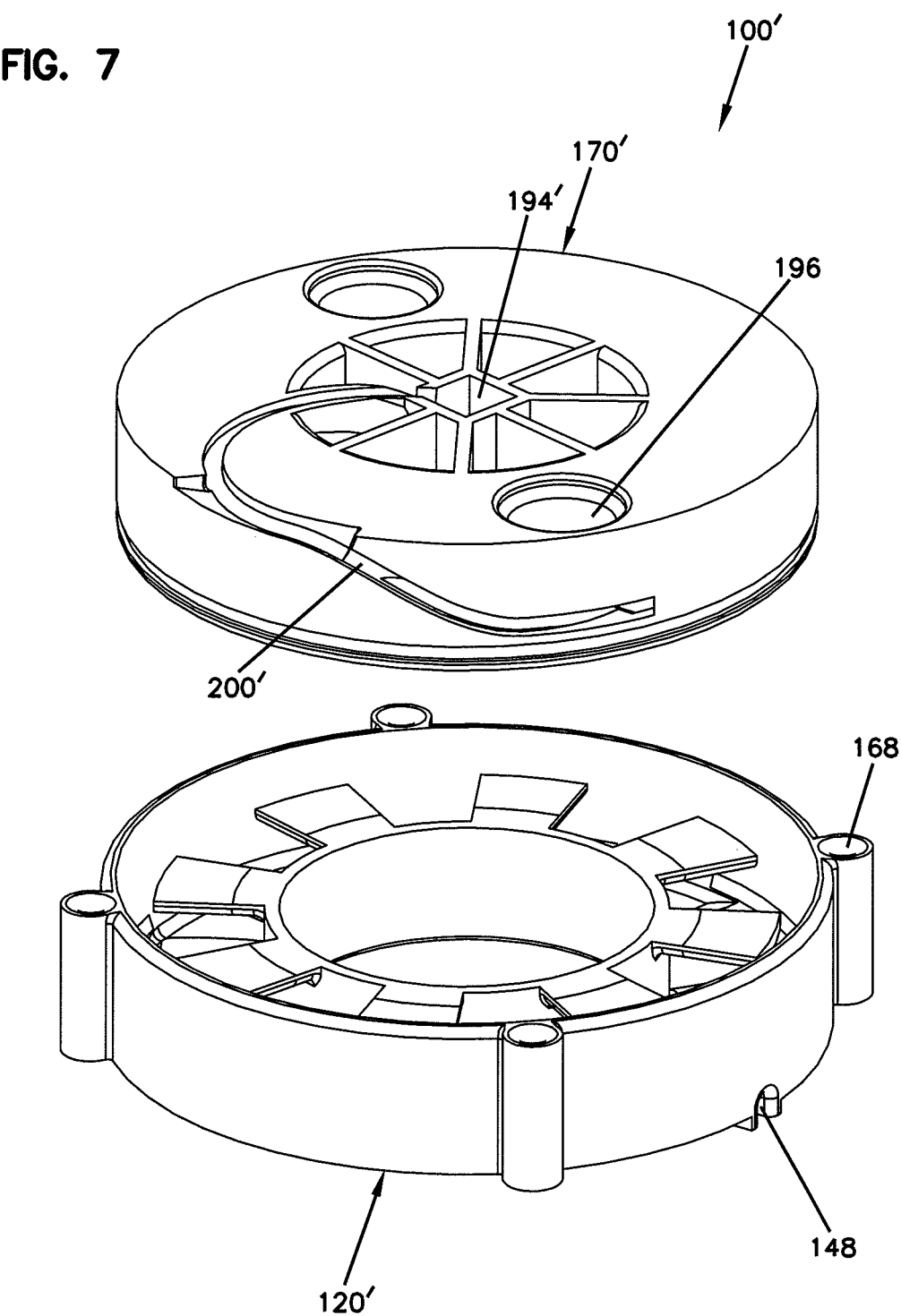
FIG. 7 is an exploded perspective view of another cable winding and unwinding device according to the principles of the present disclosure.
Figure 8:
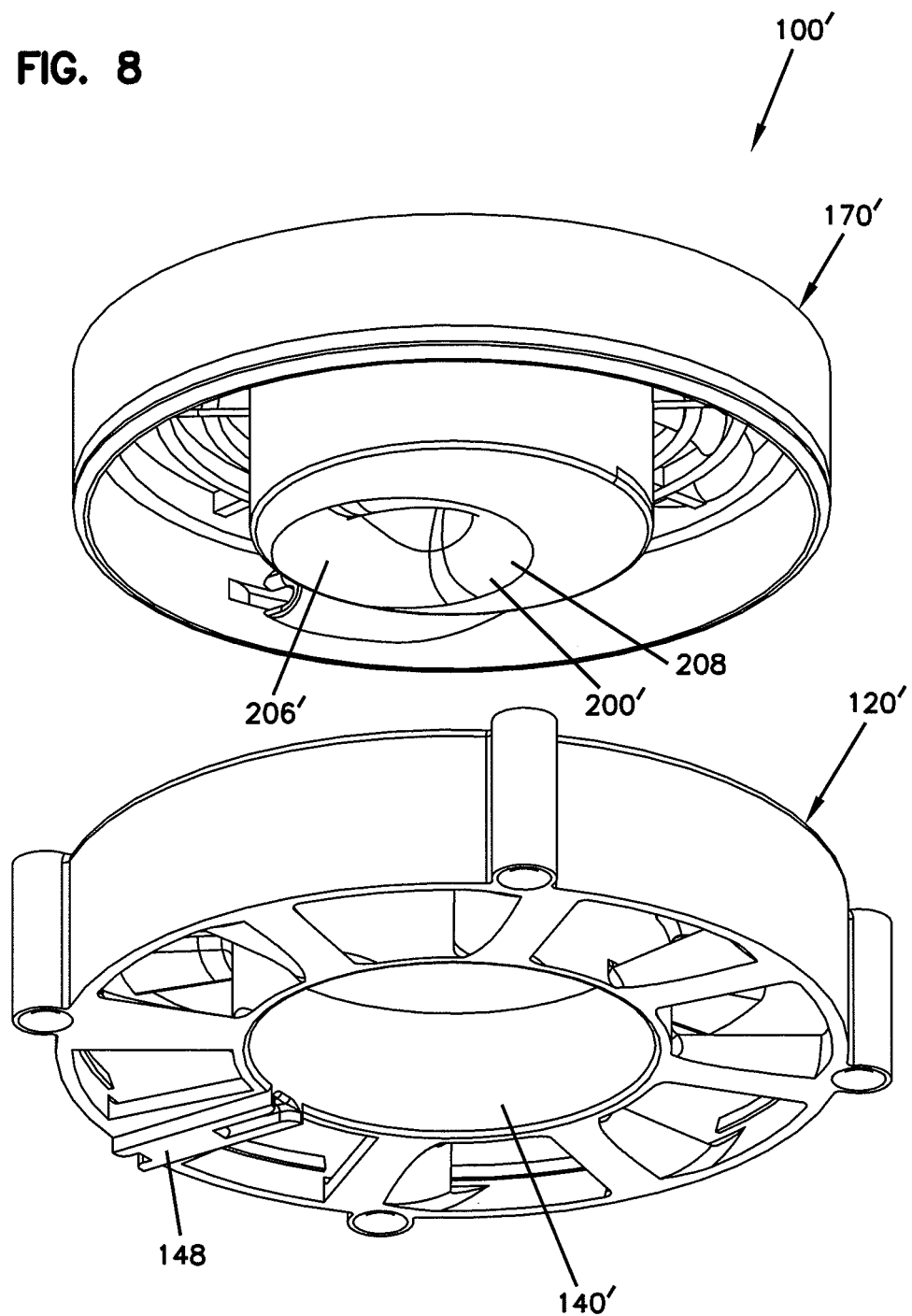
FIG. 8 is another exploded perspective view of the cable winding and unwinding device of FIG. 7.
Figure 9:
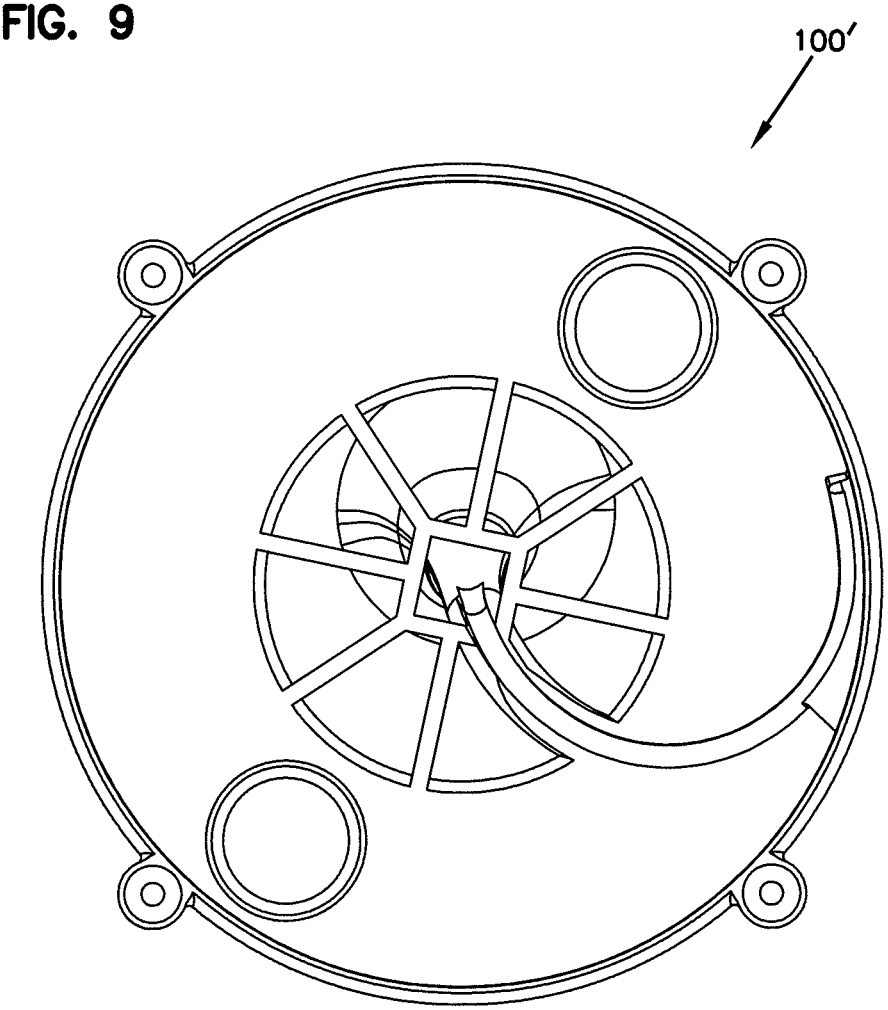
FIG. 9 is a top plan view of the cable winding and unwinding device of FIG. 7.
Figure 10:
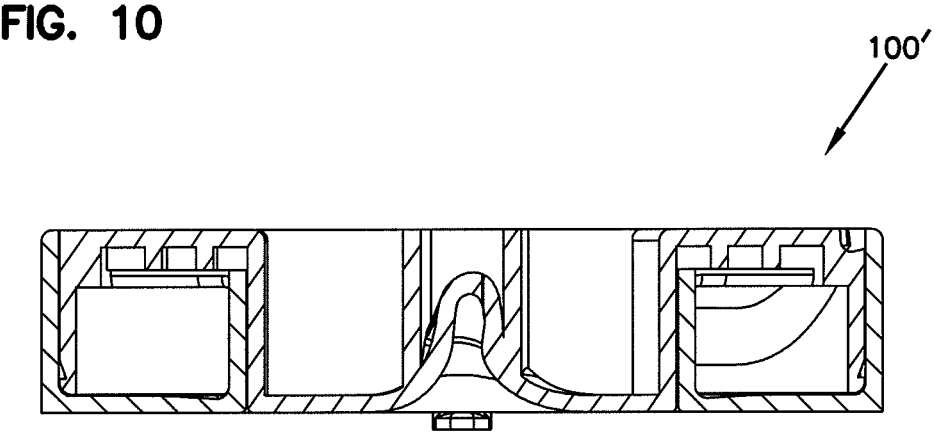
FIG. 10 is a cross-sectional side elevation view of the cable winding and unwinding device of FIG. 7.
Figure 13:
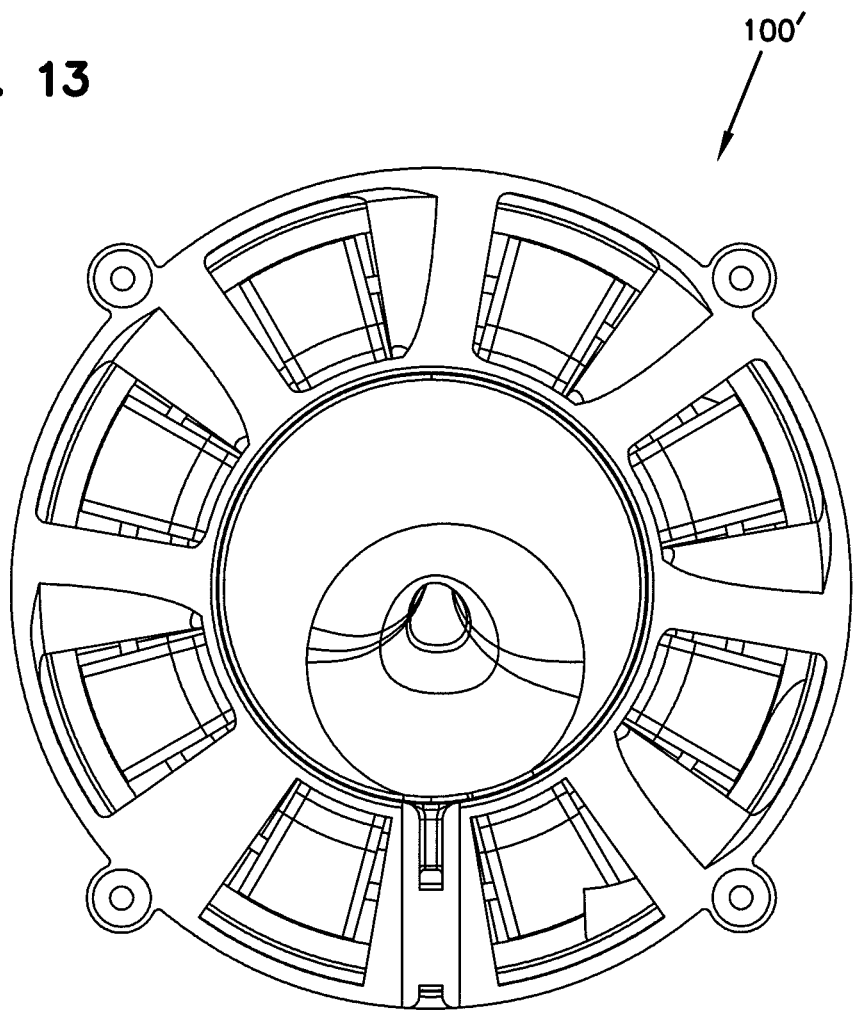
FIG. 13 is a bottom plan view of the cable winding and unwinding device of FIG. 7.
Figure 14:
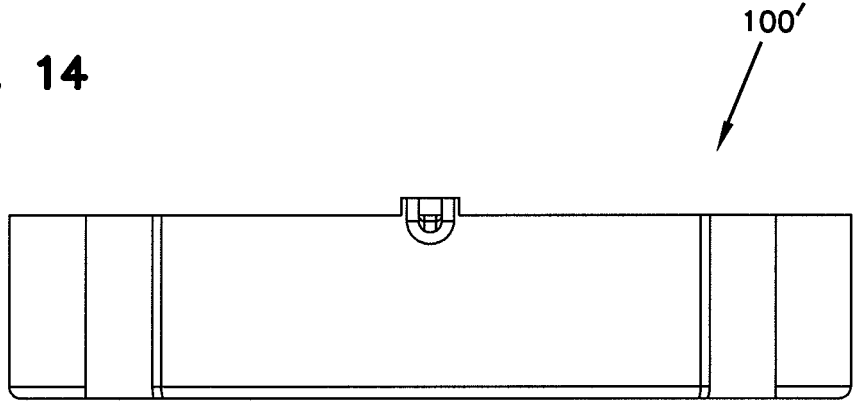
FIG. 14 is a side elevation view of the cable winding and unwinding device of FIG. 7.
Figure 15:
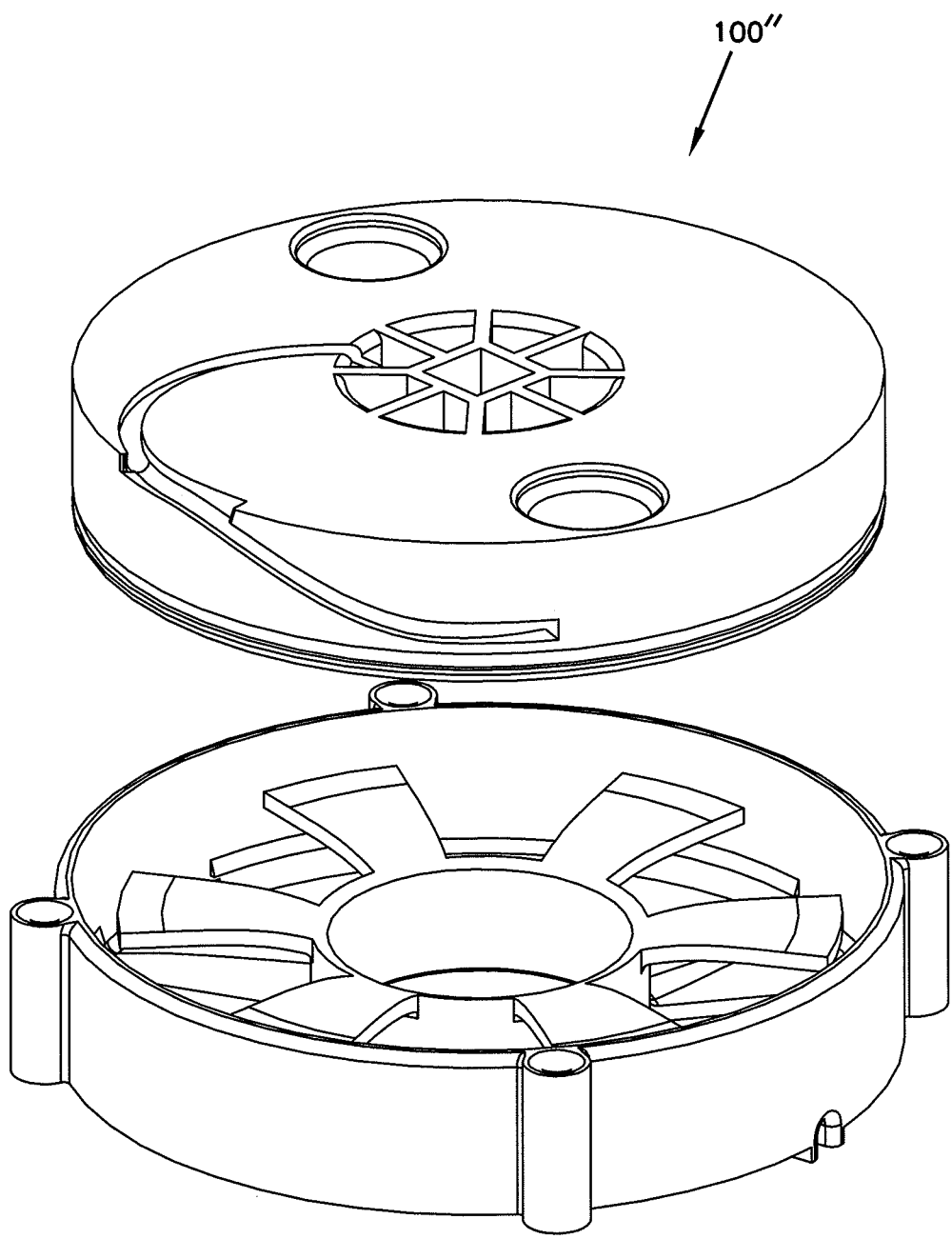
FIG. 15 is an exploded perspective view of still another cable winding and unwinding device according to the principles of the present disclosure.
Figure 16:
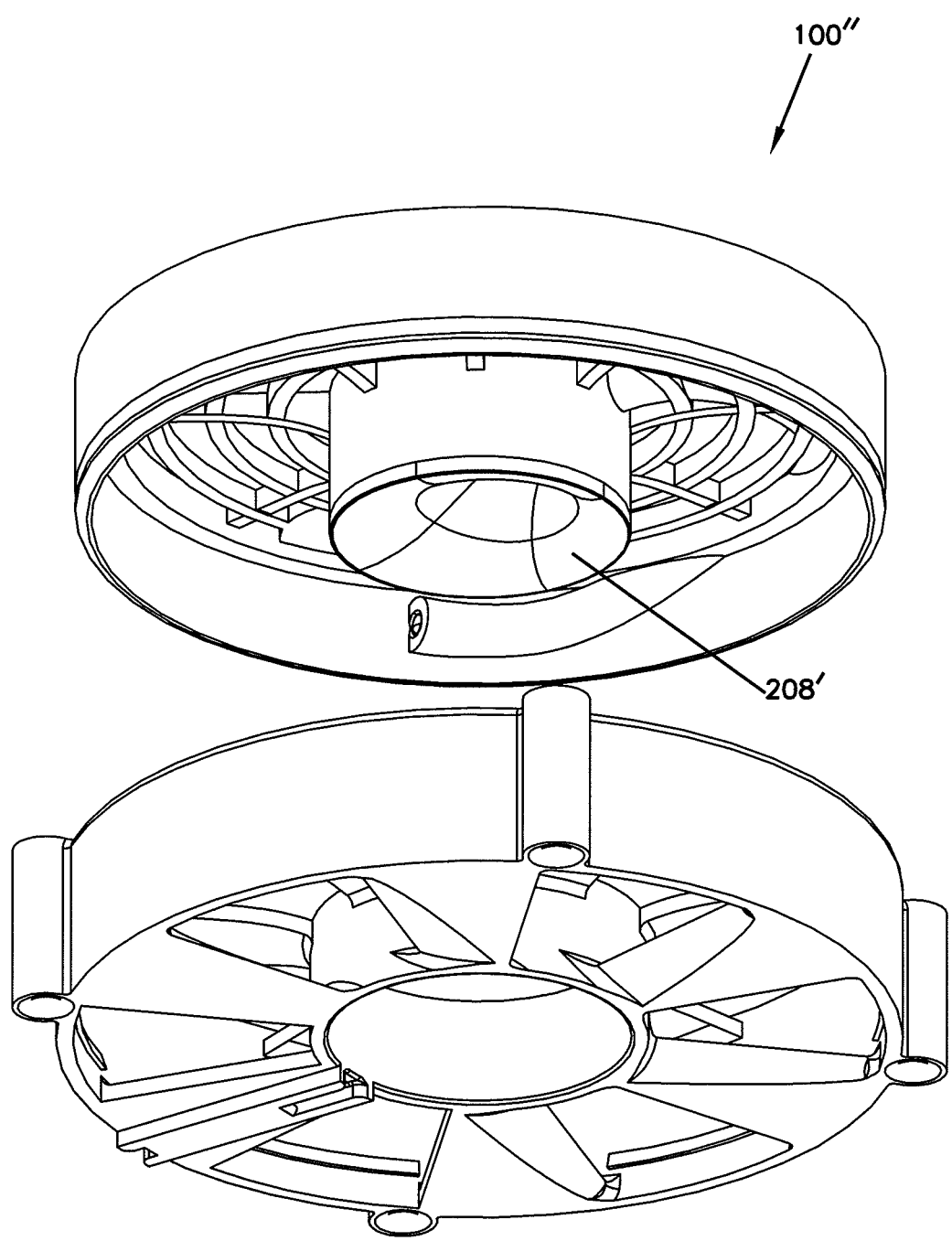
FIG. 16 is another exploded perspective view of the cable winding and unwinding device of FIG. 15.
Figure 17:
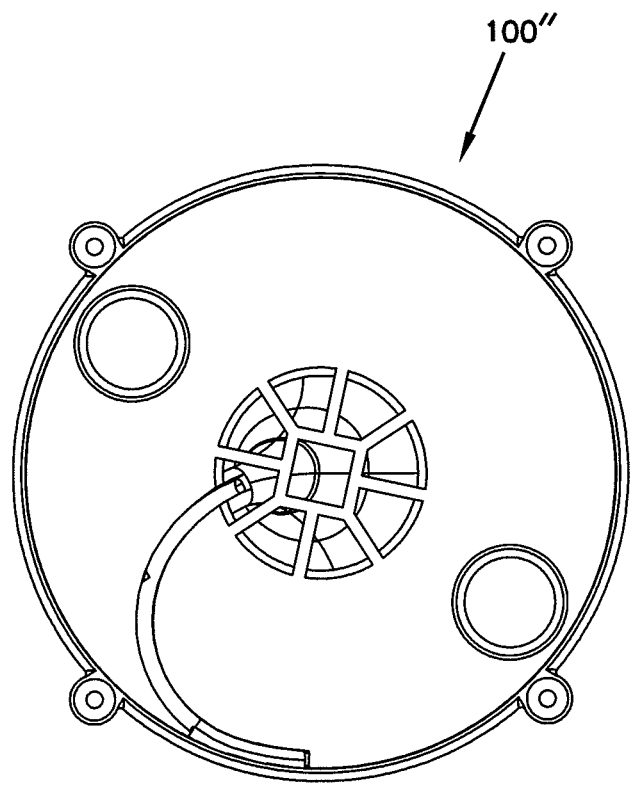
FIG. 17 is a top plan view of the cable winding and unwinding device of FIG. 15.
Figure 18:
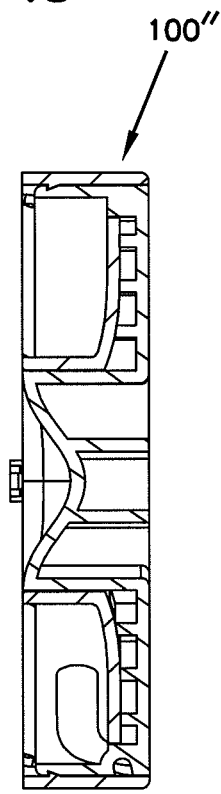
FIG. 18 is a cross-sectional end elevation view of the cable winding and unwinding device of FIG. 15.
Figure 19:
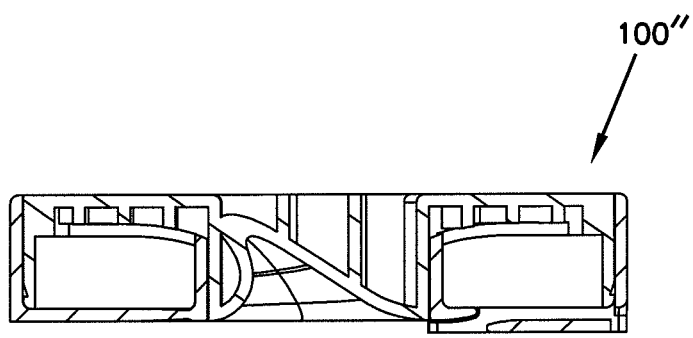
FIG. 19 is a cross-sectional side elevation view of the cable winding and unwinding device of FIG. 15.
Figure 20:
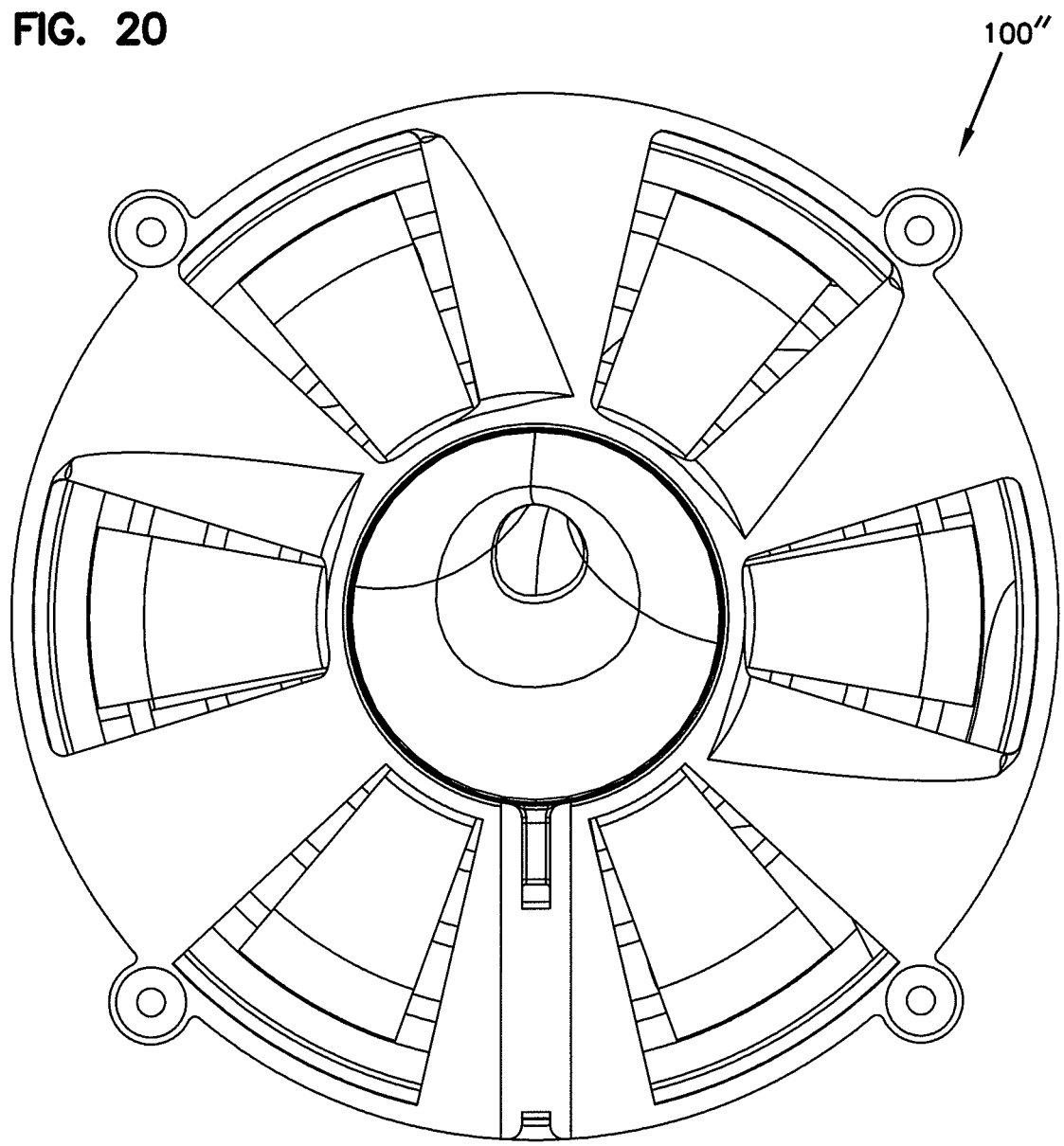
FIG. 20 is a bottom plan view of the cable winding and unwinding device of FIG. 15.
Figure 21:
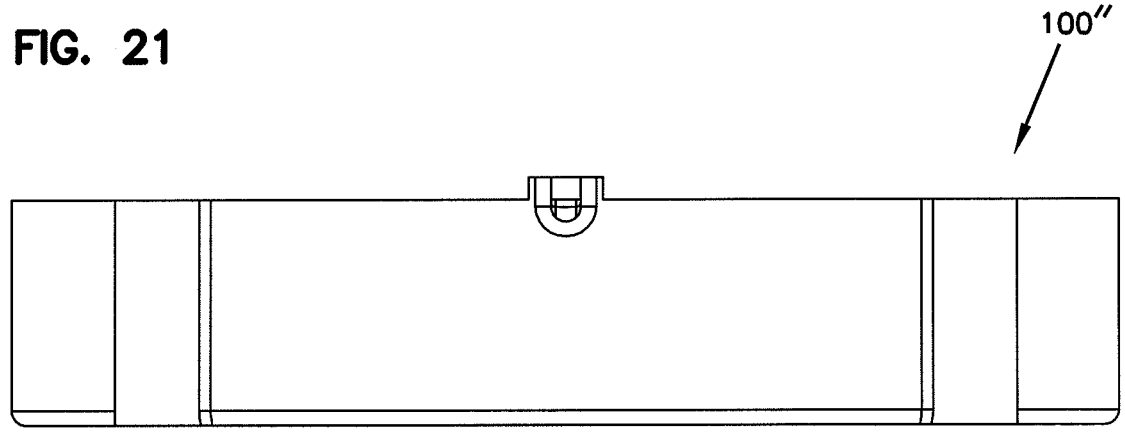
FIG. 21 is a side elevation view of the cable winding and unwinding device of FIG. 15.
Figure 22:
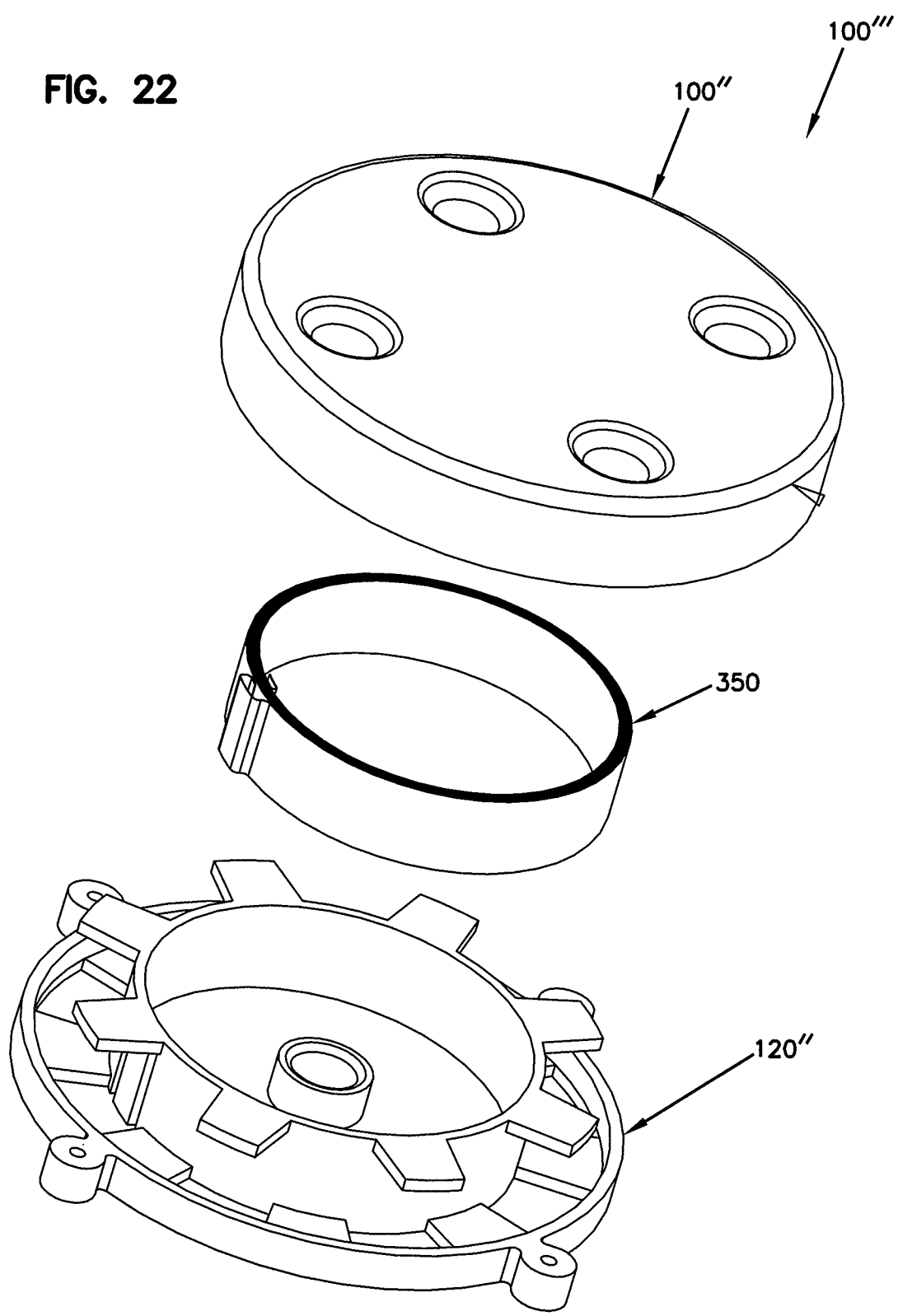
FIG. 22 is an exploded perspective view of yet another cable winding and unwinding device according to the principles of the present disclosure.
Figure 23:
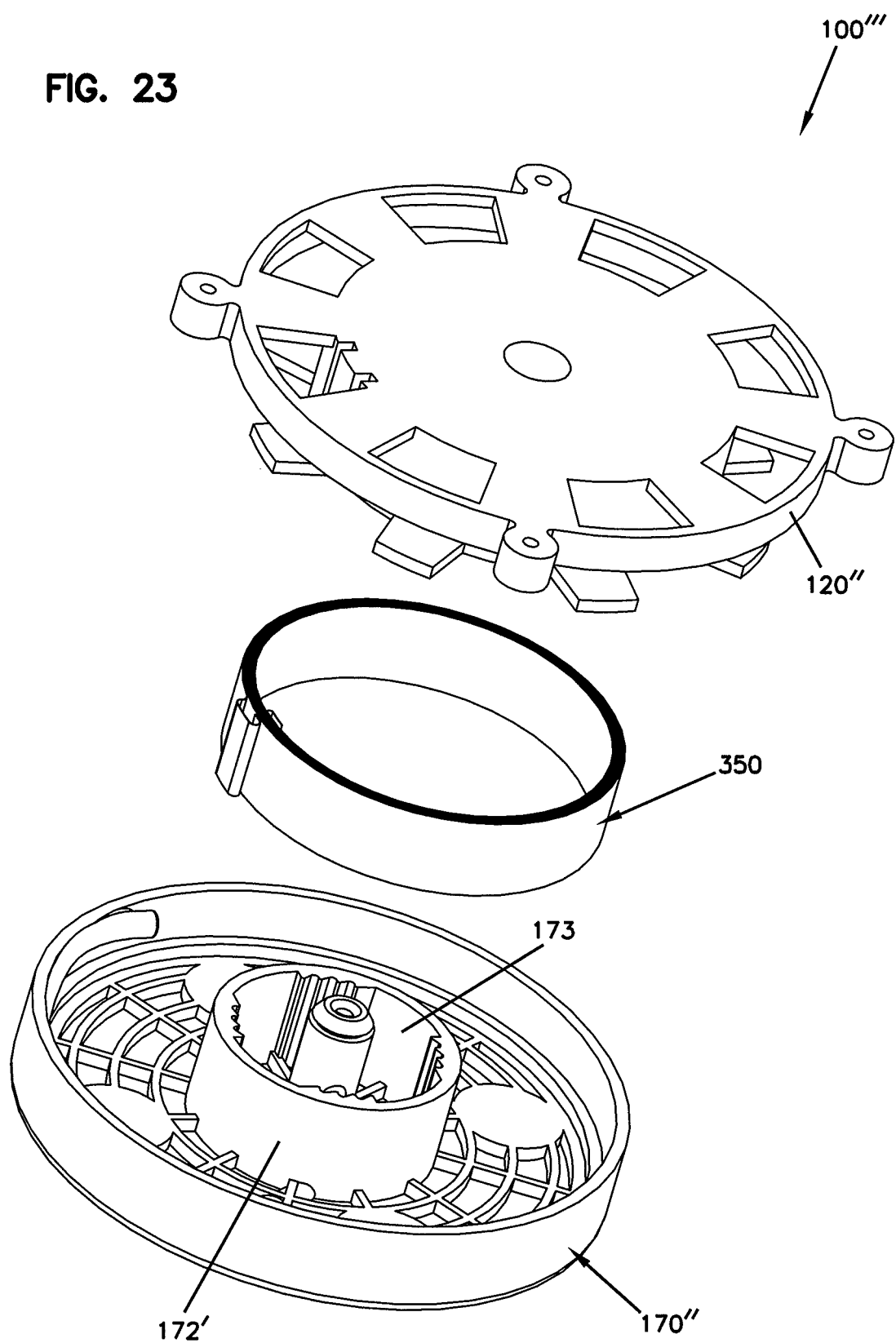
FIG. 23 is another exploded perspective view of the cable winding and unwinding device of FIG. 22.
Figure 24:
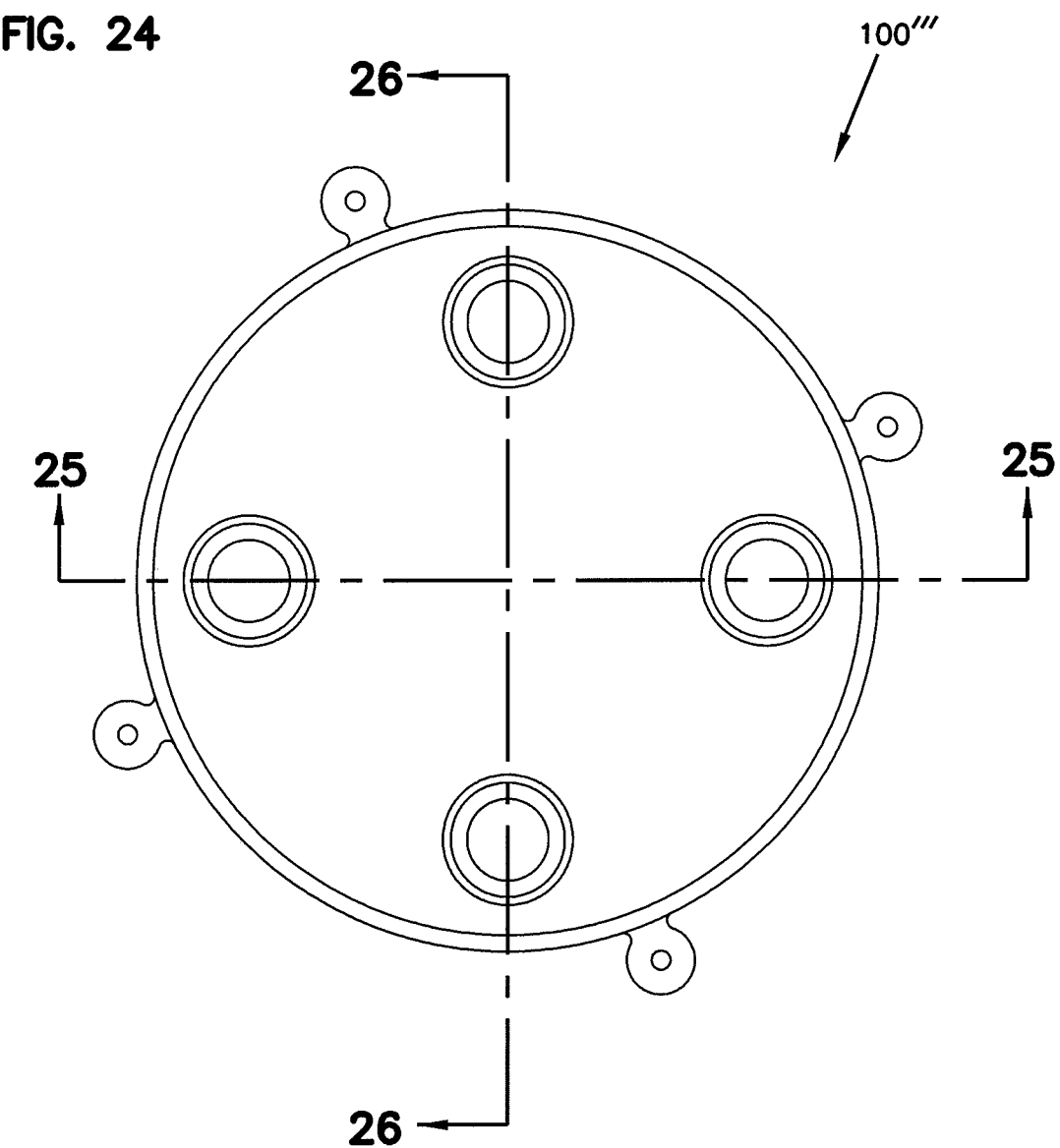
FIG. 24 is a top plan view of the cable winding and unwinding device of FIG. 22.
Figure 25:
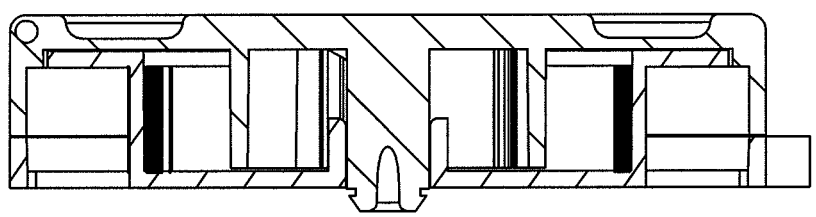
FIG. 25 is a cross-sectional side elevation view of the cable winding and unwinding device of FIG. 22.
Figure 26:
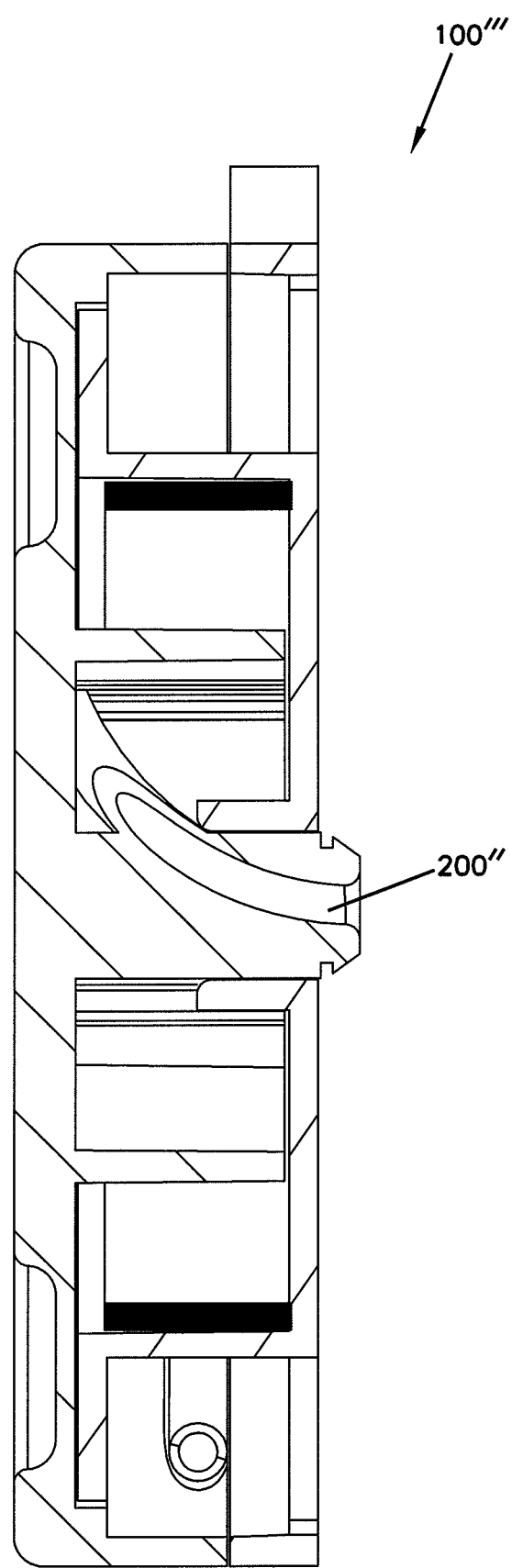
FIG. 26 is a cross-sectional end elevation view of the cable winding and unwinding device of FIG. 22.
Figure 27:
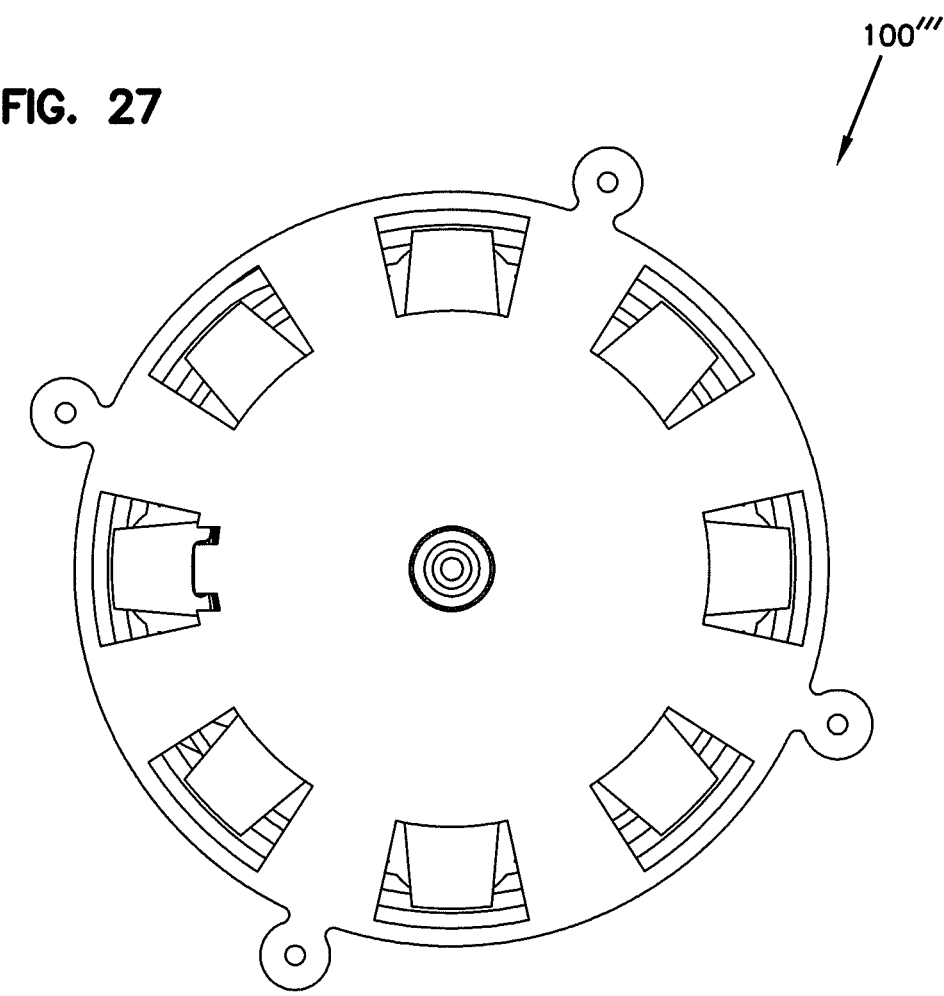
FIG. 27 is a bottom plan view of the cable winding and unwinding device of FIG. 22.
Figure 28:
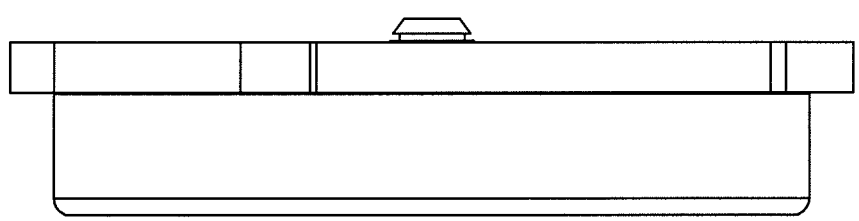
FIG. 28 is a side elevation view of the cable winding and unwinding device of FIG. 22.
Figure 29:
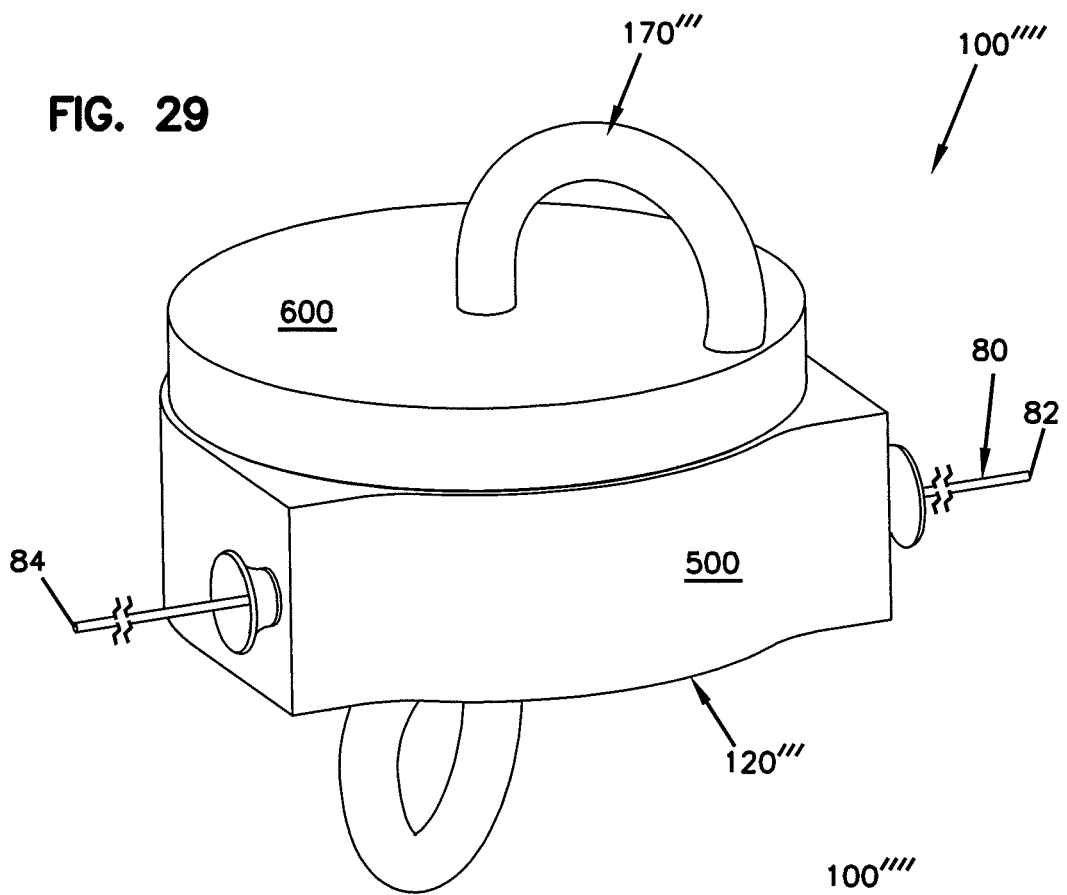
FIG. 29 is a perspective view of still another cable winding and unwinding device according to the principles of the present disclosure, the cable winding and unwinding device storing a stored portion of a telecommunications cable and paying-out a paid-out portion of the telecommunications cable.
Figure 30:
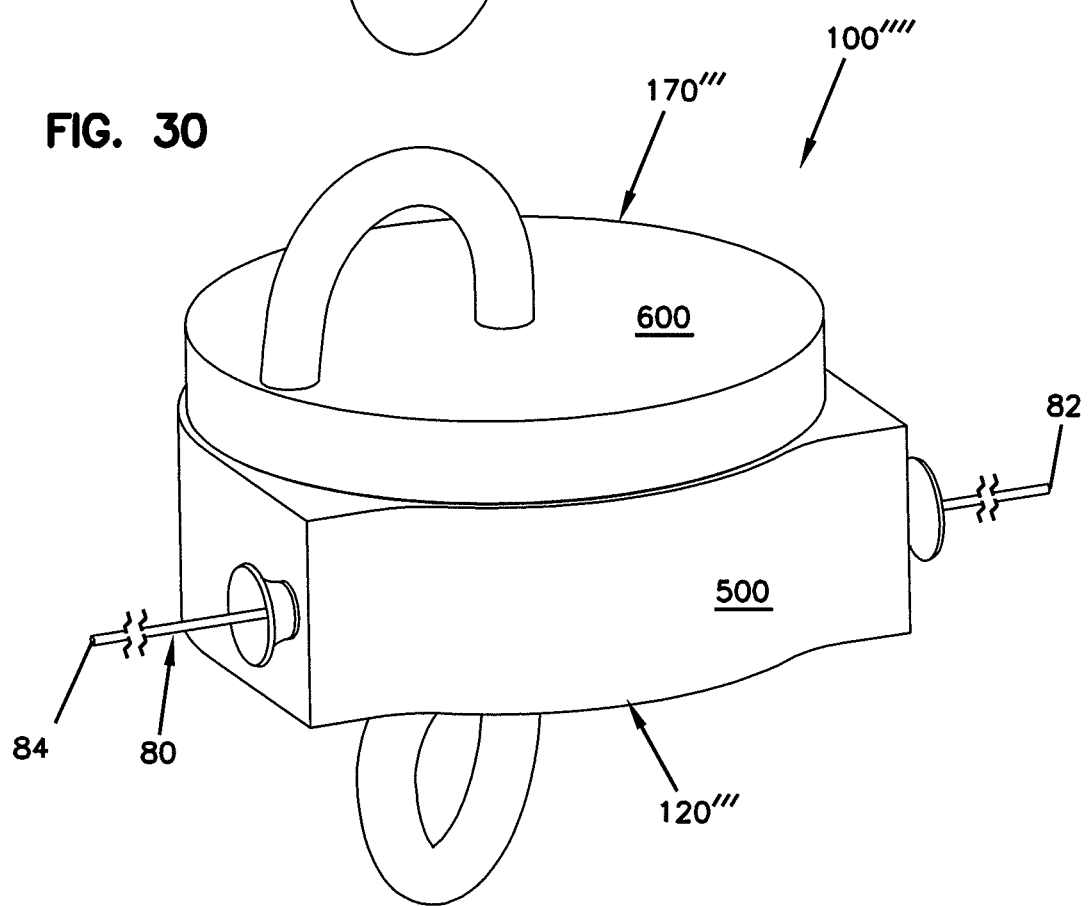
FIG. 30 is the perspective view of FIG. 29, but with a cable winder of the cable winding and unwinding device rotated from its position of FIG. 29.

The winding/unwinding member 170' may further include a drive attachment 194' that includes a square internal drive. As illustrated at FIG. 7, the winding/unwinding member 170' may further include finger pockets 196 that may be engaged by placing a finger or a thumb in and thereby rotating the winding/unwinding member 170' relative to the base 120'.

The base 120' may include a set of fastener holes 168. The fastener holes 168 may be used to mount the cable spool assembly 100' to a structure (a panel, a cabinet, etc.). The base 120' may further include an entrance/exit 148. As illustrated, the entrance/exit 148 extends radially outwardly from a spool portion 140' and provides a conduit between an interior of the spool portion 140' and an exterior of the cable spool assembly 100'. The smooth transitional area 208 and the entrance/exit 148 may work together to allow the telecommunications cable 80 to enter and exit the cable spool assembly 100' along a plane that is substantially parallel to a mounting plane of the cable spool assembly 100'.

The retraction and deployment of the telecommunications cable 80 from the cable spool assembly 100' is similar to that of the cable spool assembly 100. However, the first end 82 of the telecommunications cable 80 may either be routed downwardly through the opening 206' and exit through a bottom of the cable spool assembly 100', or the first end 82 may be routed through the entrance/exit 148 and thereby enter and exit the cable spool assembly 100' substantially perpendicular to an axis of rotation of the winding/unwinding member 170' (e.g., the axis A3). The second end 84 may enter/exit the cable spool assembly 100' in a manner similar to the cable spool assembly 100.

In configurations of the cable spool assembly 100' that include the first end 82 of the telecommunications cable 80 exiting in a downward direction, the first end 82 may be extended away from or retracted into the cable spool assembly 100' in any direction within a hemisphere H, as illustrated at FIG. 11. Furthermore, an entrance/exit vector V may vary in orientation as the first end 82 is extended from and retracted into the cable spool assembly 100'.

Turning now to FIGS. 15-21, a third embodiment of a cable spool assembly 100" is illustrated. The cable spool assembly 100" is similar to the cable spool assembly 100' but may include smaller proportions on an entrance/exit guiding funnel 208' compared with the smooth transitional area 208.

Turning now to FIGS. 22-28, a fourth embodiment of a cable spool assembly 100''' is illustrated according to the principals of the present disclosure. The cable spool assembly 100''' includes several of the features found in the cable spool assemblies 100, 100', and 100", and wraps and unwraps the telecommunications cable 80 in a similar manner when deploying and retracting the telecommunications cable 80. The cable spool assembly 100''' further includes a spring 350 that is rotationally connected between a winding/unwinding member 170'' and a base 120''. In addition, a cable path 200'' is substantially included in an interior of the winding/unwinding member 170'' and is illustrated not including an externally facing channel. The spring 350 may torsionally preload the winding/unwinding member 170'' against the base 120" and thereby provide automatic retraction or semi-automatic retraction of the telecommunications cable 80 into the cable spool assembly 100'''.

In certain embodiments, it may be desired that the winding/unwinding member 170" be held with respect to the base 120" and thereby prevent unwanted retraction of the telecommunications cable 80 even though the spring 350 is applying a torsional load between the winding/unwinding member 170" and the base 120". To accommodate this, the winding/unwinding member 170" includes a hub 172' that includes a catch and release mechanism 173 (see FIG. 23). The catch and release mechanism 173 may include dogs, one-way clutches, centrifugal weights, and/or other items that are typically found in spool hubs that have catch and release features. The catch and release mechanism 173 may be adapted to hold the winding/unwinding member 170" rotationally with respect to the base 120" at certain rotational positions. Alternatively, the catch and release mechanism 173 may be adapted to hold the winding/unwinding member 170" at certain rotational velocities and release the winding/unwinding member 170" at other rotational velocities and thereby allow a user to trigger the activation of the spring 350 and the rewinding of the telecommunications cable 80. When deploying the telecommunications cable 80 from the cable spool assembly 100''', tension in the telecommunications cable 80 may result in winding the spring 350. The winding of the spring 350 may be released upon the retraction of the telecommunications cable 80.

Turning now to FIGS. 29-37 and 40, a fifth embodiment of a cable spool assembly 100'''' is illustrated according to the principals of the present disclosure. The cable spool assembly 100'''' wraps and unwraps the telecommunications cable 80 similar to the cable spool assemblies 100, 100', 100", 100'''. The cable spool assembly 100'''' includes a base 120'''' that has similarities to bases 120, 120', 120". The cable spool assembly 100'''' also includes a winding/unwinding member 170'''' similar to the winding/unwinding members 170, 170', 170".

In certain embodiments, the cable spool assembly 100'''' may include a spool 400 that is rotationally separate from the winding/unwinding member 170'''' and the base 120''''. In other embodiments, the spool 400 may be connected to the base 120''''. The cable spool assembly 100'''' may retract and deploy the telecommunications cable 80 by rotationally moving the winding/unwinding member 170'''' relative to the base 120''''. As with the previous embodiments, the winding/unwinding member 170'''' may be spring loaded relative to the base 120''''.

To deploy the telecommunications cable 80, the first end 82 may be pulled away from the cable spool assembly 100'''' and thereby cause rotation of the winding/unwinding member 170''''. In addition, the telecommunications cable 80 may be deployed by pulling on the second end 84 thereby rotating the spool 400. In certain embodiments, deploying the telecommunications cable 80 by the first end 82 may be preferred as any twisting that may occur along the telecommunications cable 80 is distributed along a length of the telecommunications cable 80.

Figure 31:
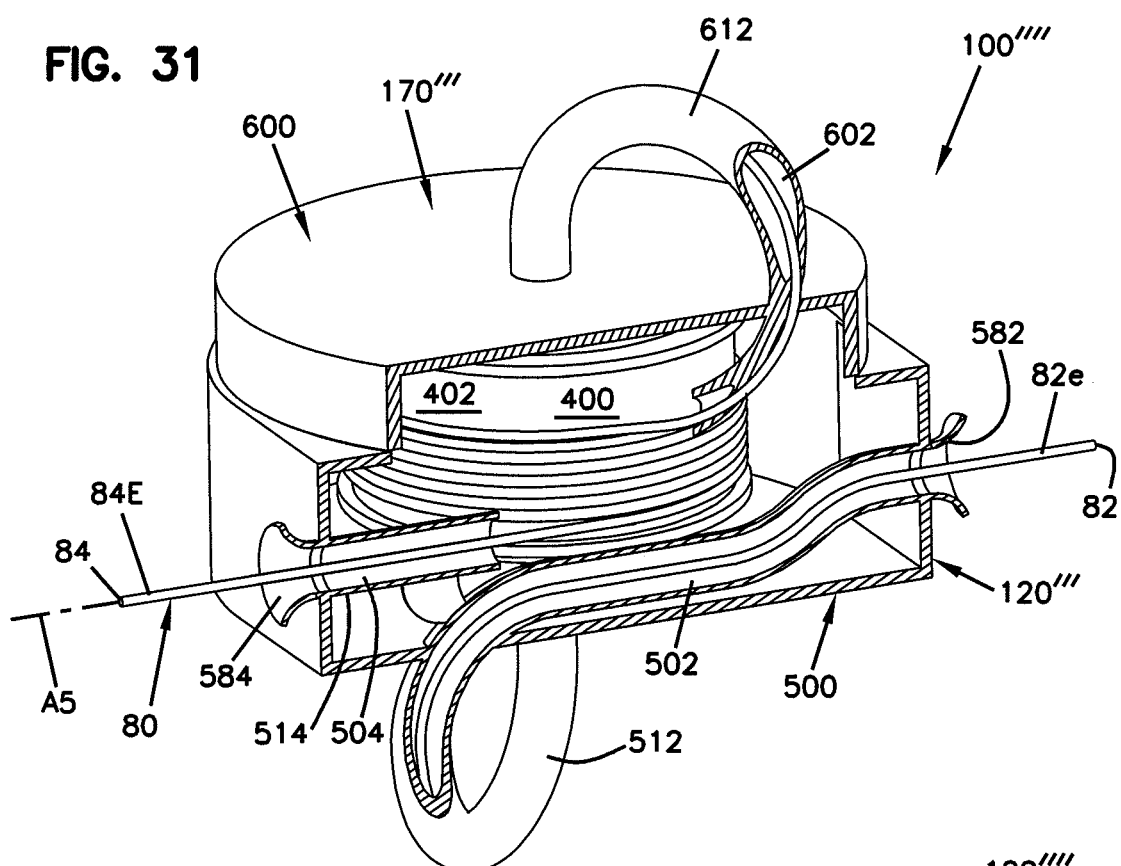
FIG. 31 is the perspective view of FIG. 29, but with a cut-away taken from the cable winder of FIG. 30 and a housing and a cable routing guide structure of the cable winding and unwinding device thereby revealing a spool of the cable winding and unwinding device with the telecommunications cable wound around the spool.
Figure 32:
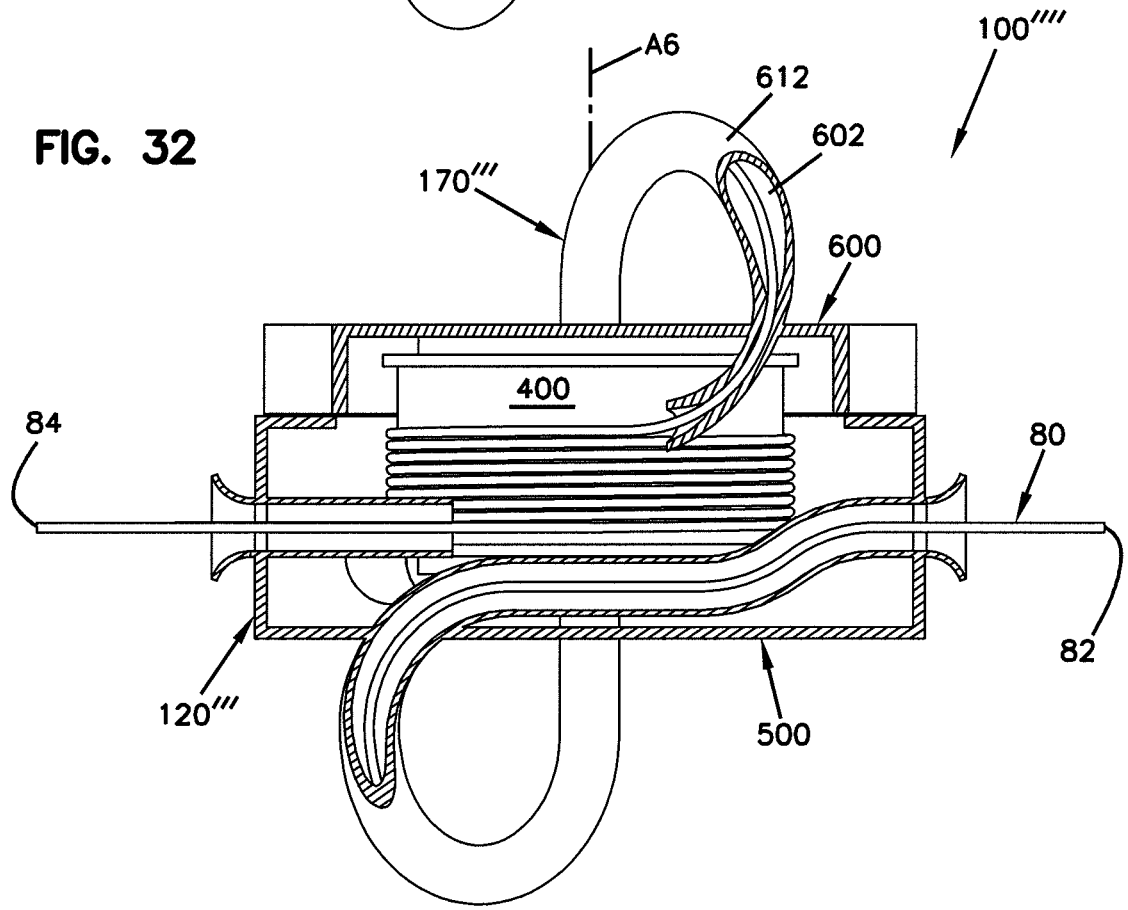
FIG. 32 is an elevation side view of the cable winding and unwinding device of FIG. 29 with the cut-away of FIG. 31 taken.

As illustrated at FIG. 31, the telecommunications cable 80 may extend from the cable spool assembly 100'''' along an axis A5 that includes an external portion 82e of the telecommunications cable 80 adjacent the first end 82 and an external portion 84e of the telecommunications cable 80 that is adjacent the second end 84. Thus, the telecommunications cable 80 may be deployed and retracted along the axis A5, and portions of the telecommunications cable 80 on both sides of the cable spool assembly 100'''' may be coaxial with each other.

As illustrated at FIGS. 29-32, the base 120'''' may include a housing 500 that generally encloses the telecommunications cable 80 when the telecommunications cable 80 is within the cable spool assembly 100''''. The housing 500 may include a funnel 582 adjacent the external portion 82e, and a funnel 584 adjacent the external portion 84e. The funnels 582, 584 allow the external portion 82e and the external portion 84e to be pulled in directions other than along the axis A5 without violating bend radius requirements of the telecommunications cable 80.

Figure 34:
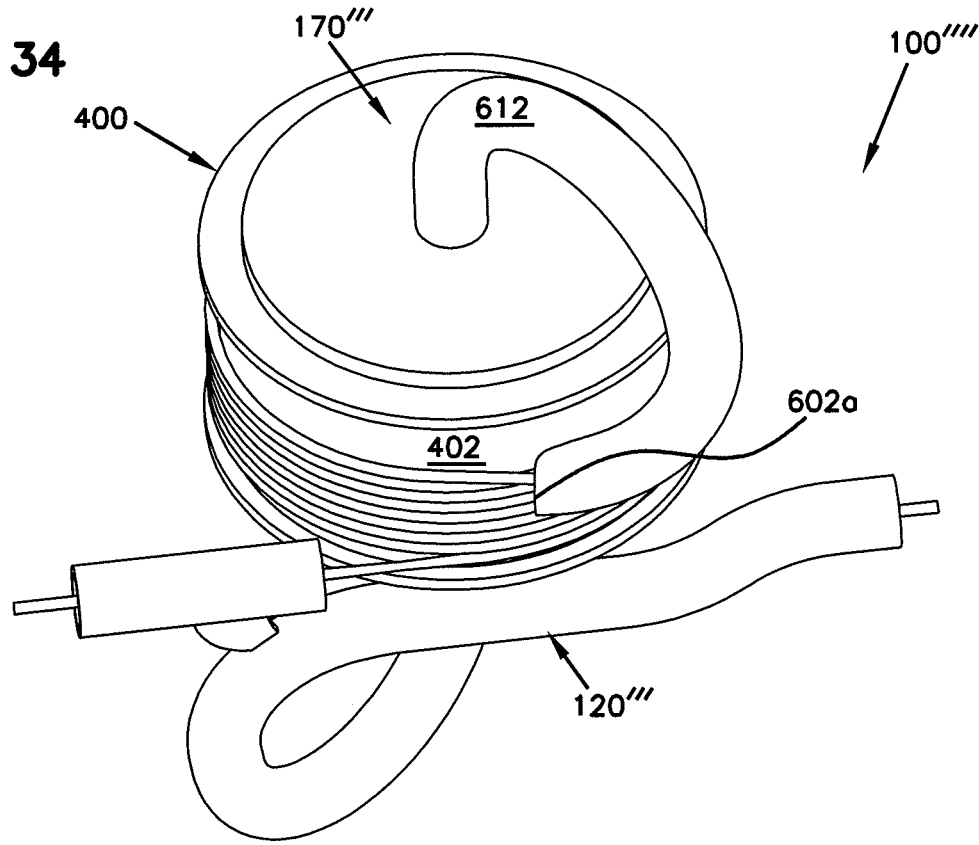
FIG. 34 is the perspective view of FIG. 33, but with a cut-away taken from the cable winder, the spool, and the cable routing guide structure.
Figure 35:
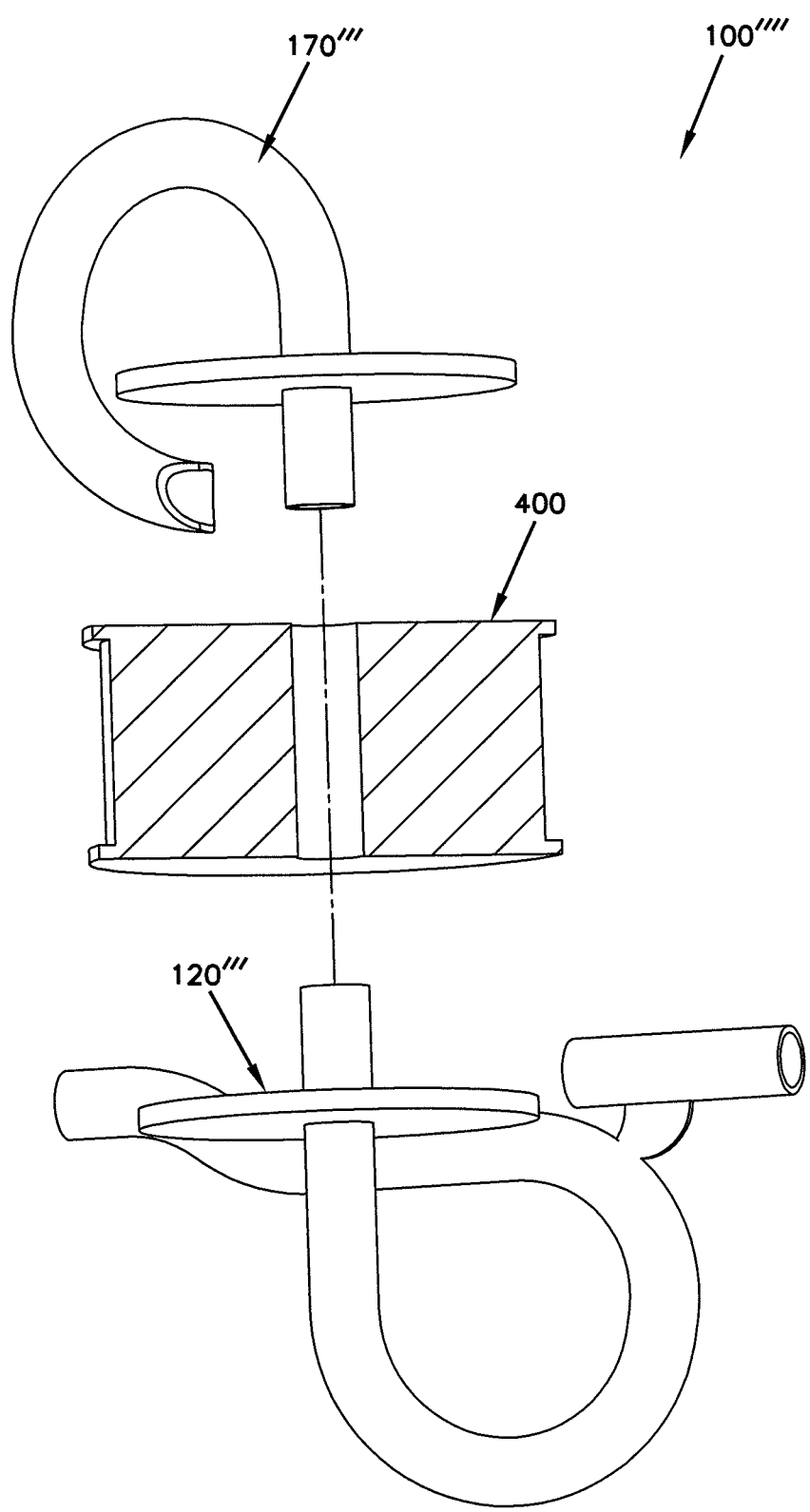
FIG. 35 is an exploded perspective view of the cable winder of FIG. 30 and the spool and the cable routing guide structure of FIG. 31 with a cut-away taken from the spool.
Figure 36:
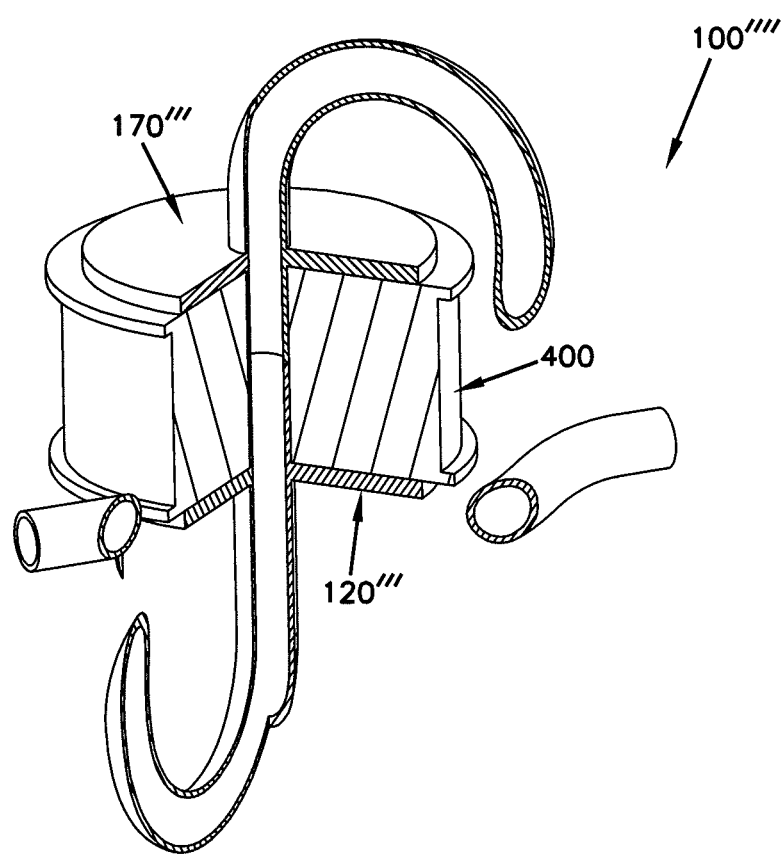
FIG. 36 is the perspective view of FIGS. 29 and 31, but showing only the cable winder of FIG. 30 and the spool and the cable routing guide structure of FIG. 31 assembled and with the cut-away of FIG. 34 taken.

As depicted, the base 120'''' includes a first passage 502 that is adjacent the external portion 82e. The base 120'''' may also include a passage 504 adjacent the external portion 84e. As illustrated at FIGS. 31 and 34, the passage 504 aligns the external portion 84e generally tangential to the spool 400. As further illustrated at FIGS. 31 and 34, the first passage 502 may align the external portion 82e with the external portion 84e. The first passage 502 may further align the telecommunications cable 80 with the winding/unwinding member 170''''. In the depicted embodiment, the telecommunications cable 80 is thereby aligned generally coaxially with an axis A6 of the cable spool assembly 100'''' when transitioning between the first passage 502 and the winding/unwinding member 170''''.

The first passage 502 may be defined within a tube-like structure 512, and the passage 504 may be defined within a tube-like structure 514. The first passage 502 may align with the funnel 582 at a first end. The first passage 502 may become concentric with the axis A6 at a second end. The spool 400 may be rotatably mounted on the second end of the structure 512. Likewise, the winding/unwinding member 170'''' may be rotatably mounted at the second end of the structure 512. The tube-like structure 514 may be aligned with the funnel 584 and may be further aligned with the first end of the first passage 502.

As illustrated at FIGS. 29-32, the winding/unwinding member 170'''' may include a housing 600. The housing 600, in conjunction with the housing 500, may substantially enclose the telecommunications cable 80 in the cable spool assembly 100''''. The housing 600 may rotate along with the winding/unwinding member 170''''. The housing 600 may be sealed with the housing 500 and thereby provide a sealed enclosure with the housing 500 to house the telecommunications cable 80.

Figure 33:
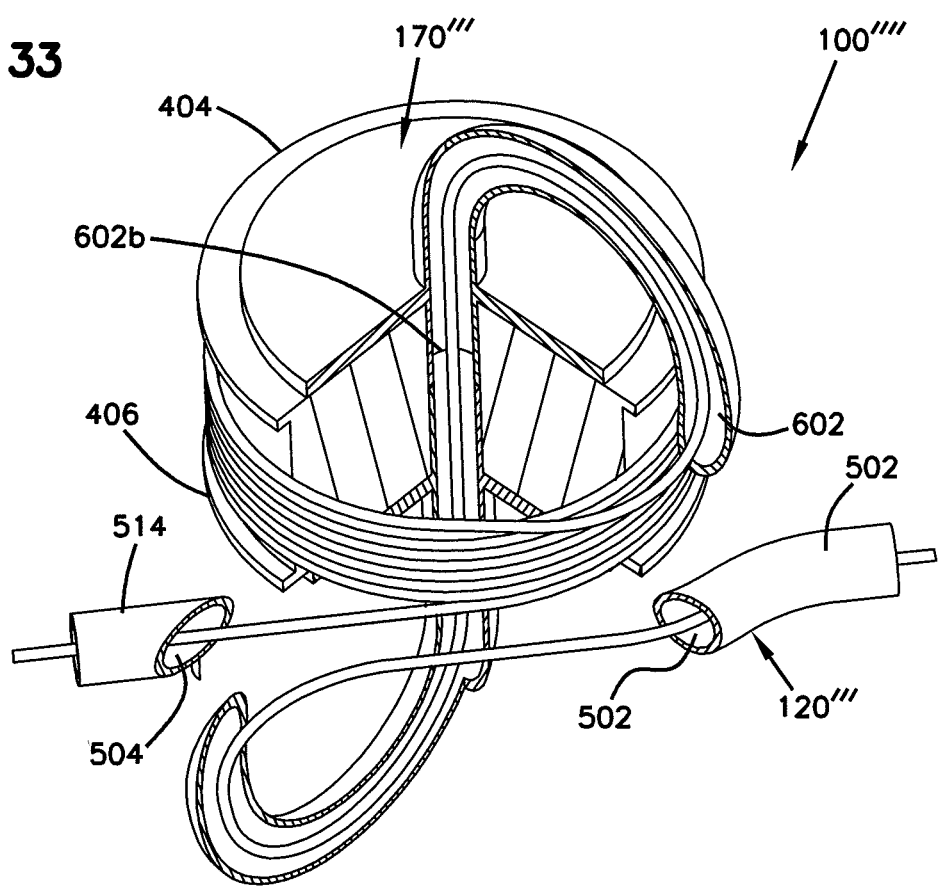
FIG. 33 is a perspective view of the telecommunications cable of FIG. 29, the cable winder of FIG. 30, and the spool and the cable routing guide structure of FIG. 31 assembled.

The winding/unwinding member 170'''' may include a passage 602 that extends from a first end 602a (see FIG. 34) to a second end 602b (see FIG. 33). The first end 602a may be generally tangentially aligned with the spool 400. In particular, the first end 602a may be generally aligned with a wrapping area 402 of the spool 400. The wrapping area 402 may extend between a first flange 404 and a second flange 406 of the spool 400.

The winding/unwinding member 170'''' may be rotationally connected to the base 120'''' by a threaded connection and thereby move the first end 602a as wrapping and unwrapping of the telecommunications cable 80 occurs and thereby wind the telecommunications cable 80 in a helical manner about the wrapping area 402 of the spool 400. The winding/unwinding member 170'''' may be connected to the base 120'''' in such a way that reciprocating motion occurs between the winding/unwinding member 170'''' and the base 120'''' thereby winding the telecommunications cable 80 in a helical manner that reverses and continues with multiple layers of cable depth.

The passage 602 may be included in a tube-like structure 612. The tube-like structure 612 may smoothly continue from the tube-like structure 512 at a joint between the tube-like structure 512 and the tube-like structure 612. The tube-like structures 512, 514, and 612 may be coated internally with a low friction material (e.g., Teflon®) to facilitate easy passage of the telecommunications cable 80 through the passages 502, 504, and 602.

As illustrated at FIG. 37, the telecommunications cable 80 may be defined along various segments. As the telecommunications cable 80 is retracted and deployed, the telecommunications cable 80 may pass from one segment to other segments. In particular, the external portion 82e is defined adjacent the first end 82 and may be a deployed portion of the telecommunications cable 80 adjacent the first end 82. As the external portion 82e enters the first passage 502, an interior segment 82i may be defined along the length of the first passage 502. Upon entering the passage 602 of the winding/unwinding member 170''' an interior segment 80i of the telecommunications cable 80 may be defined. The interior segment 80i may be defined along the length of the passage 602. Upon transitioning to the wrapping area 402 of the spool 400, a wrapping segment 80r may be defined about the wrapping area 402. The wrapping segment 80r may disappear upon all of the telecommunications cable 80 being removed from the spool 400, as may happen upon full deployment of the telecommunications cable 80 and may also not appear when initially wrapping the telecommunications cable 80 about the spool 400. The wrapping segment 80r may continue around the wrapping area 402 multiple times, and each revolution may form one of the wraps 86. Upon transitioning away from the spool 400, an internal segment 84i may be defined within the tube-like structure 514. Upon exiting the tube-like structure 514, the internal segment 84i may transition to the external portion 84e. And finally, the external portion 84e terminates at the second end 84. Either or both of the ends 82, 84 may be terminated by a fiber optic connector.

Figure 38:
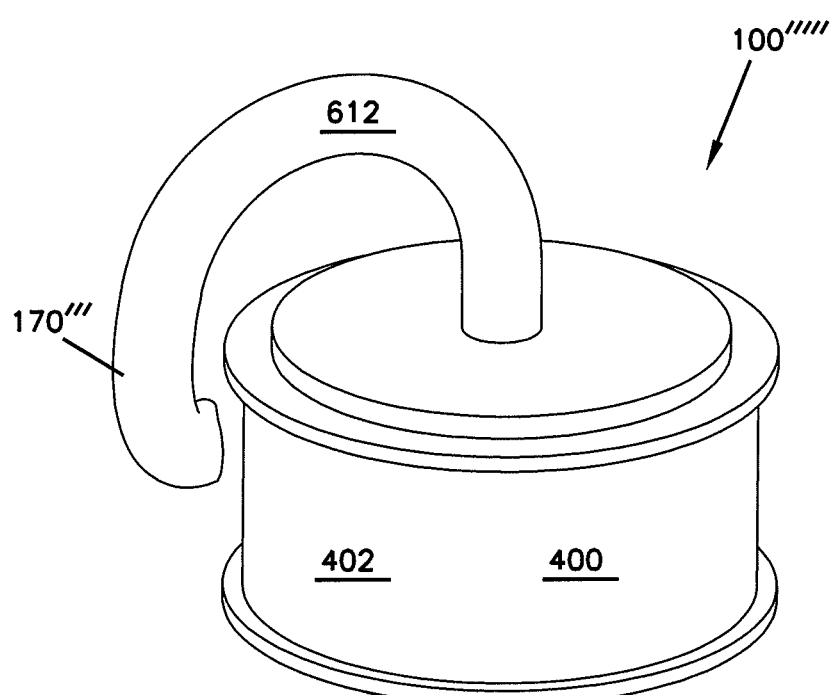
FIG. 38 is a perspective view of yet another cable winding and unwinding device according to the principles of the present disclosure.
Figure 39:
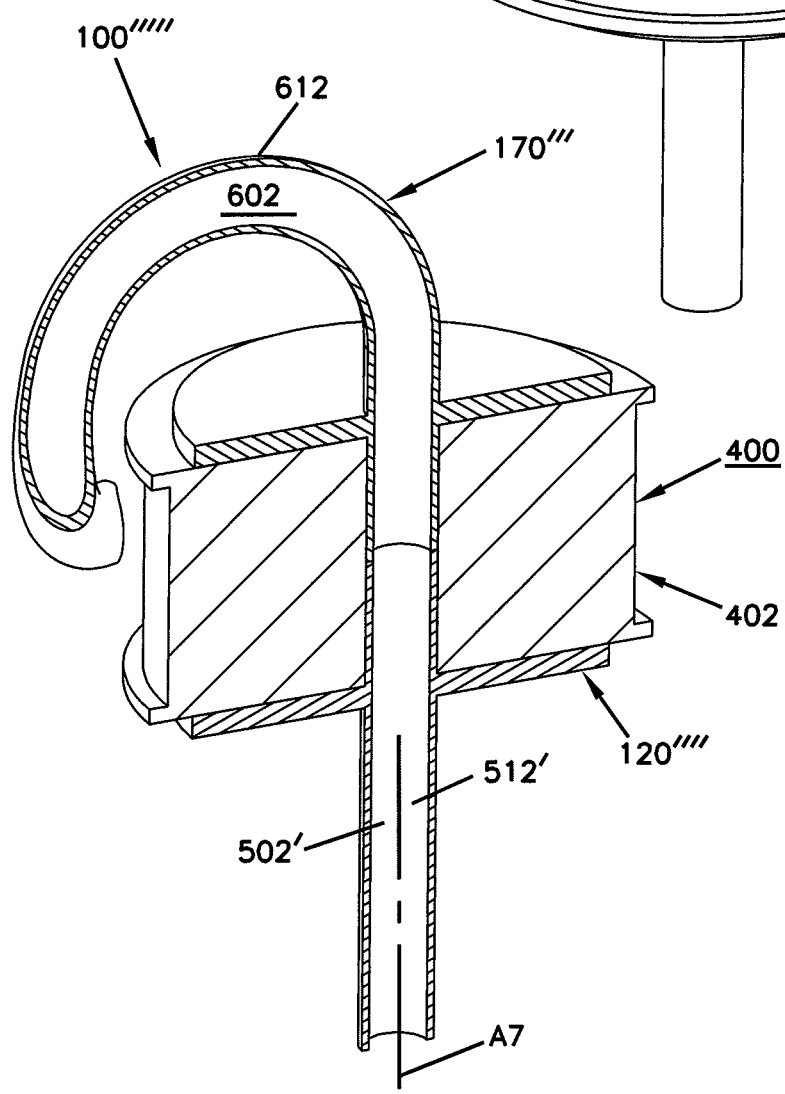
FIG. 39 is the perspective view of FIG. 38, but with a cut-away taken.

Turning now to FIGS. 38 and 39, a sixth embodiment of a cable spool assembly 100'''' is illustrated according to the principals of the present disclosure. The cable spool assembly 100'''' is similar to the cable spool assembly 100''' except that the external portion 82e is deployed from the cable spool assembly 100'''' generally parallel to an axis A7 of the cable spool assembly 100''''. The axis A7 is generally coaxial with an axis of rotation of the spool 400. The cable spool assembly 100'''' may include a housing and other features that were illustrated on the cable spool assembly 100'''. When paying-out the telecommunications cable 80 from the cable spool assembly 100'''', the first end 82 extends in a direction substantially parallel to the axis A7, and the second end 84 of the telecommunications cable 80 extends tangentially to the wrapping area 402 of the spool 400. Thus, the external portion 84e is oriented approximately perpendicular to the external portion 82e. The cable spool assembly 100'''' includes a base 120'''' similar to the base 120''' but with a tubular portion 512' that is centered about the axis A7. The tube-like structure 512' includes a passage 502' that is generally concentric with the axis A7.

Figure 40:
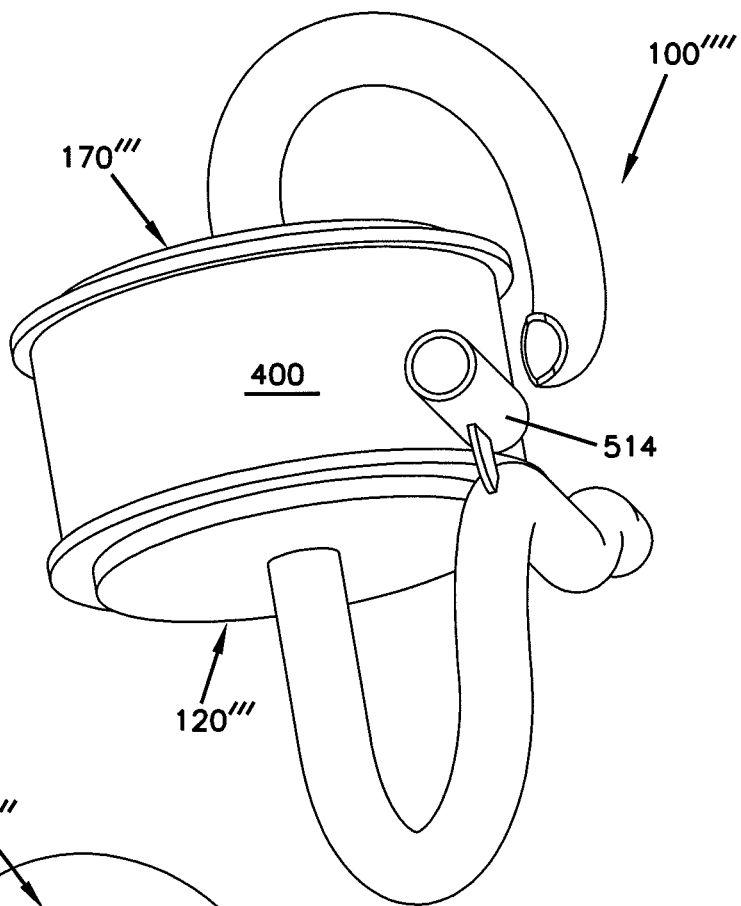
FIG. 40 is a perspective view of the cable winder of FIG. 30 and the spool and the cable routing guide structure of FIG. 31 assembled.
Figure 41:
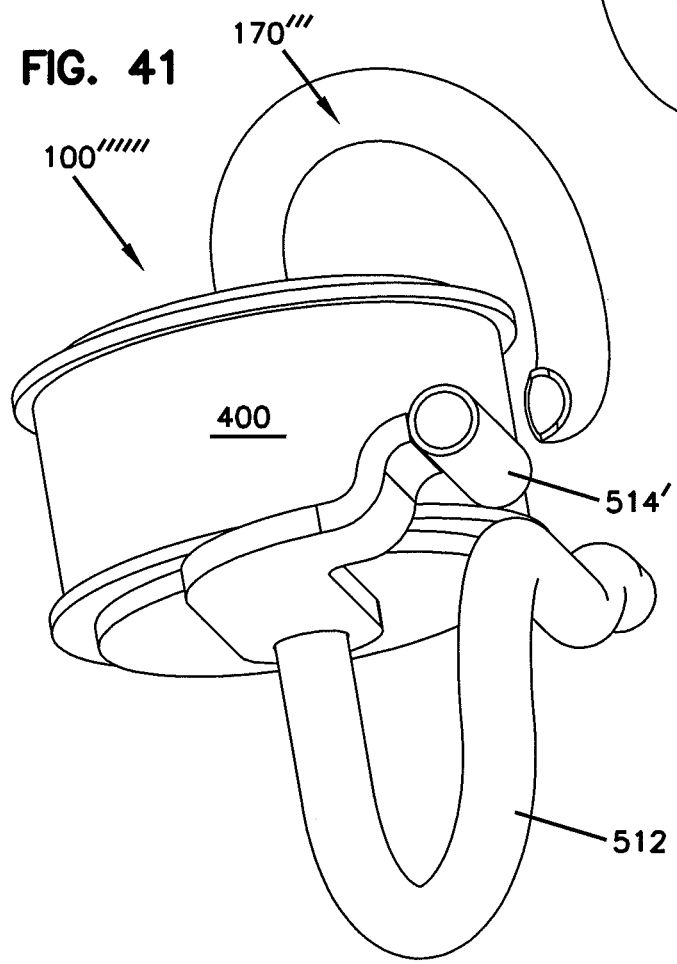
FIG. 41 is a perspective view of still another cable winding and unwinding device according to the principles of the present disclosure, the perspective view of FIG. 41 taken with a similar orientation to the perspective view of FIG. 40.
Figure 42:
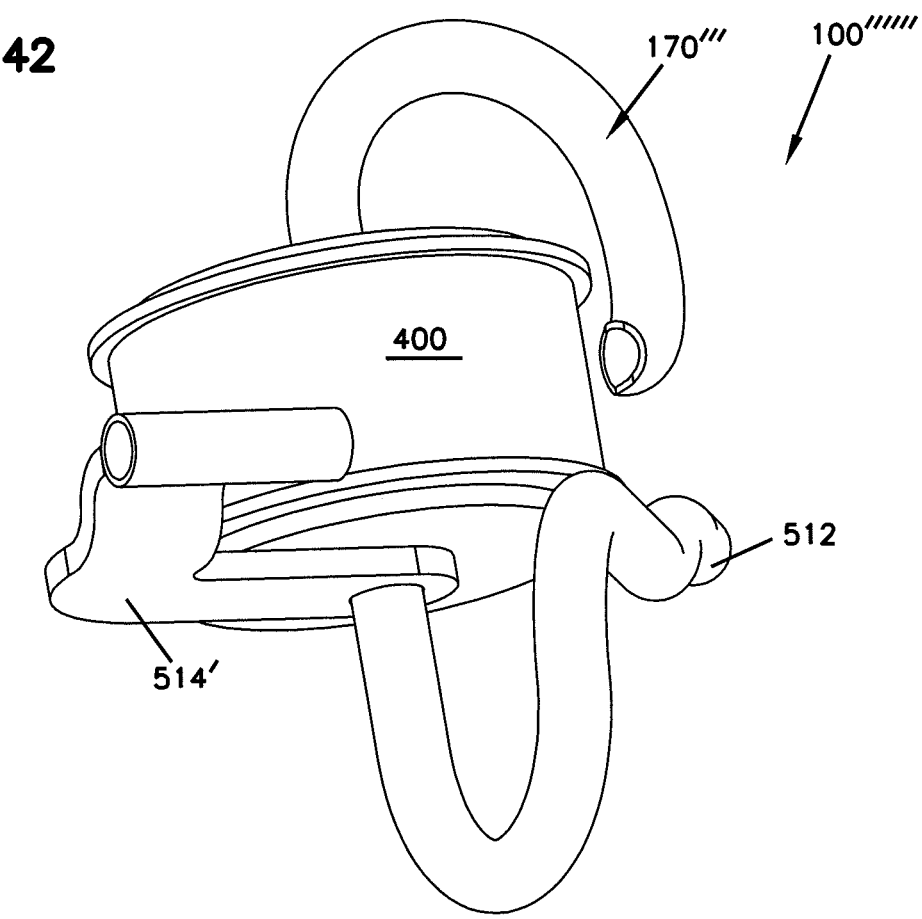
FIG. 42 is another perspective view of the cable winding and unwinding device of FIG. 41.
Figure 43:
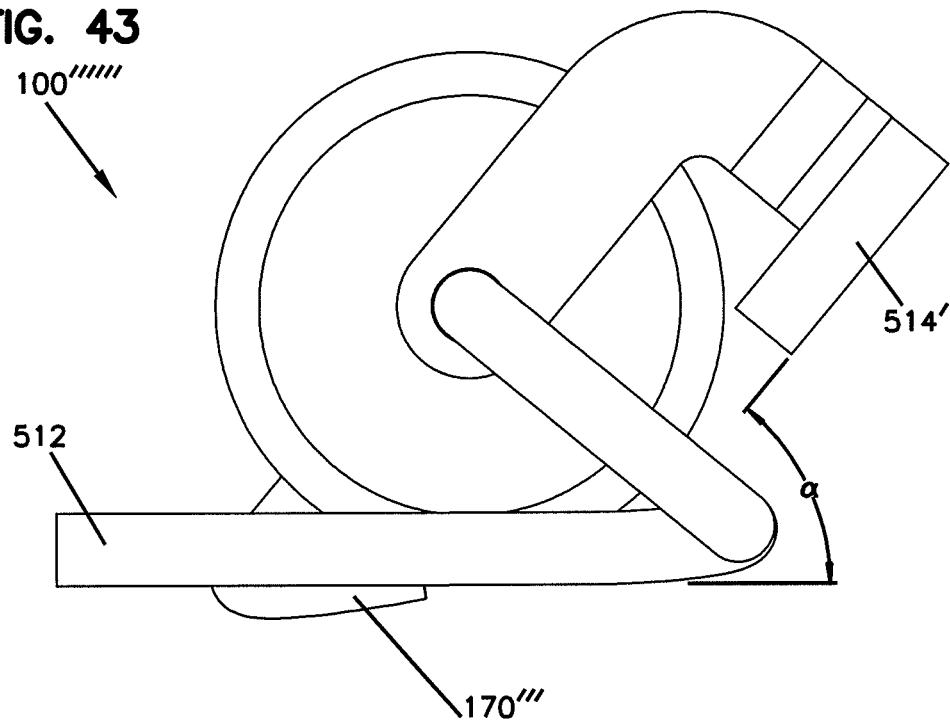
FIG. 43 is a top plan view of the cable winding and unwinding device of FIG. 41.

Turning now to FIGS. 41-43, a seventh embodiment of a cable spool assembly 100''''' is illustrated according to the principles of the present disclosure. As illustrated at FIGS. 41 and 40, the cable spool assembly 100''''' is in a similar perspective view as the cable spool assembly 100''''. In the configurations illustrated at FIGS. 40 and 41, the cable spool assemblies 100'''' and 100''''' generally perform in the same manner. However, the cable spool assembly 100''''' includes a tube-like portion 514' that is rotatably mounted about the tube-like structure 512 adjacent the spool 400. As illustrated at FIGS. 42 and 43, the rotatable mounting of the tube-like structure 514' allows an angle α to be defined between the tube-like structure 512 and the tube-like structure 514'. Thus, the angle α between the external portion 84e and the external portion 82e can be adjusted between 0 degrees and 360 degrees. In certain embodiments, the angle α may be a fixed angle (e.g., 90 degrees, 180 degrees, 270 degrees, etc.) and may not necessarily be adjustable. In other embodiments, the angle α may be adjusted as desired, including while the telecommunications cable 80 is being deployed (i.e., paid-out) and/or reeled-in.

According to the principals of the present disclosure, the cable spool assemblies 100, 100', 100'', 100''', 100'''', 100''''', 100'''''' can pay-out and/or reel-in an extended length of the telecommunications cable 80 without disconnecting the telecommunications cable 80 from a paid-out end 82 (i.e. the first end). The cable spool assemblies 100, 100', 100'', 100''', 100'''', 100''''', 100'''''' can pay-out and/or reel-in the extended length of the telecommunications cable 80 without disconnecting the telecommunications cable 80 from a base end 84 (i.e. the second end). In particular, the paid-out end 82 can be pulled from the cable spool assemblies 100, 100', 100'', 100''', 100'''', 100''''', 100'''''' at various lengths including the extended lengths to bring the paid-out end 82 of the telecommunications cable 80 to a desired location.

As mentioned above, the cable spool assemblies 100, 100', 100'', 100''', 100'''', 100''''', 100'''''' do not require a rotary union. Rather, the wraps 86 of a stored portion of the telecommunications cable 80 within a storage area of the cable spool assembly 100, 100', 100'', 100''', 100'''', 100''''', 100'''''' are transformed into axial twist along the length of the telecommunications cable 80 while the cable spool assembly 100, 100', 100'', 100''', 100'''', 100''''', 100'''''' is paying-out a paid-out portion of the telecommunications cable 80. The accumulated twist in the telecommunications cable 80 can be managed by choosing an appropriate size (e.g., diameter) for the wrapping area 146, 402. In particular, the larger the diameter of the wrapping area 146, 402, the lower the accumulated twist per unit length of the telecommunications cable 80 (i.e., one twist per π×the diameter of the wrapping area 146, 402). Depending on the application, an optimal size of the wrapping area 146, 402 may be selected based on properties of the telecommunications cable 80 and the available space for the cable spool assembly 100, 100', 100'', 100''', 100'''', 100''''', 100''''''.

The telecommunications cable 80 is transferred from the stored portion to a transitional portion (e.g., the segments 80i and/or 82i) and then to the paid-out portion 82e. The transitional portion 80i, 82i is adjacent and between the wraps 86 of the stored portion and the paid-out portion 82e. The paid-out end 82 is continuously connected to the base end 84 while the telecommunications cable 80 is being paid-out.

The cable spool assemblies 100, 100', 100'', 100''', 100'''', 100''''', 100'''''' may include a terminal. The terminal may not necessarily be substantially extendable from the cable spool assembly 100, 100', 100'', 100''', 100'''', 100''''', 100''''''. The terminal may be generally stationary with the cable spool assembly 100, 100', 100'', 100''', 100'''', 100''''', 100''''''. In certain embodiments, the terminal may be fixed with the base 120, 120', 120'', 120''', 120'''' of the cable spool assembly 100, 100', 100'', 100''', 100'''', 100''''', 100''''''. The terminal may be attached to the base 120, 120', 120'', 120''', 120'''' by a terminal portion (i.e., the segments 84i and/or 84e) of the telecommunications cable 80. The terminal can be connectorized by a fiber optic connector and/or a fiber optic adaptor. The terminal can be permanently or semi-permanently connected to a fiber optic component, a fiber optic network, etc. If it is desired to change the position of the first end 82, the terminal can remain connected to the fiber optic component, the fiber optic network, etc.

To accommodate the first end 82 changing position, particularly when the change in position results in a difference in length between the terminal and the first end 82, the wraps 86 can be unwrapped and transfered to the paid-out portion 82*e* of the telecommunications cable 80. A number of the wraps 86 changes as the telecommunications cable 80 is paid-out. In the depicted embodiment, the telecommunications cable 80 extends continuously between the first end 82 and the second end 84. In preferred embodiments, pulling the first end 82 actuates the cable spool assembly 100, 100', 100", 100''', 100'''', 100''''', 100''''''. When the cable spool assembly 100, 100', 100", 100''', 100'''', 100''''', 100'''''' actuates, the base 120, 120', 120", 120''', 120'''' typically remains stationary.

Two of the cable spool assemblies 100, 100', 100", 100''', 100'''', 100''''', 100'''''' may be combined. For example, the mounting side of a first of the cable spool assemblies 100" may be placed adjacent to the mounting side of a second of the cable spool assemblies 100". The second ends 84 of the first and the second of the cable spool assemblies 100" may be merged (e.g., continuous with each other) thereby creating a cable spool assembly that can pay-out extended lengths of the telecommunications cable 80 from either of two ends.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A telecommunications cable spool for storing, paying-out, and reeling-in a telecommunications cable, the telecommunications cable spool comprising:

a spool defining a wrapping area adapted to receive a plurality of wraps of the telecommunications cable, the wrapping area defining a circumference;

an axis of rotation that passes through the spool within the circumference of the wrapping area;

a rotatable cable guide rotatably mounted about the axis of rotation, the rotatable cable guide including a first tube structure defining a rotating cable guide path that extends between a first end adjacent the wrapping area of the spool and a second end positioned nearer to the axis of rotation than the circumference of the wrapping area, the first end of the rotating cable guide path oriented at least partially tangential to the circumference of the wrapping area, and the second end of the rotating cable guide path oriented at least partially aligned with the axis of rotation; wherein a base including a second tube structure that defines a base cable guide path that extends between a first end adjacent the second end of the rotating cable guide path and a second end positioned adjacent a third tube having a cable entrance/exit.

2. The telecommunications cable spool of claim 1, wherein a portion of the first tube structure of the rotating cable guide path passes within the wrapping area of the spool.

3. The telecommunications cable spool of claim 1, wherein the spool is adapted to rotate.

4. The telecommunications cable spool of claim 3, wherein the spool is rotatably mounted about the axis of rotation.

5. The telecommunications cable spool of claim 1, further comprising a base for mounting the telecommunications cable spool to an external structure.

6. The telecommunications cable spool of claim 5, wherein the spool is fixedly mounted to the base.

7. The telecommunications cable spool of claim 1, wherein the second end of the base cable guide path is oriented substantially parallel to the axis of rotation.

8. The telecommunications cable spool of claim 7, wherein the second end of the base cable guide path is substantially coaxial with the axis of rotation.

9. The telecommunications cable spool of claim 1, wherein the second end of the base cable guide path is oriented substantially perpendicular to the axis of rotation.

10. The telecommunications cable spool of claim 1, wherein the wrapping area of the spool is substantially cylindrical.

* * * * *